US009731985B2

(12) United States Patent
Koehler et al.

(10) Patent No.: US 9,731,985 B2
(45) Date of Patent: Aug. 15, 2017

(54) CHEMICAL ADDITIVES FOR ENHANCEMENT OF WATER FLUX OF A MEMBRANE

(71) Applicant: LG NANOH2O, INC., El Segundo, CA (US)

(72) Inventors: Jeff Koehler, Pasadena, CA (US); Alexis Foster, Los Angeles, CA (US); Keunwon Song, Torrance, CA (US); Young Ju Lee, Daejeon (KR); Chongkyu Shin, Rancho Palos Verdes, CA (US)

(73) Assignee: LG NANOH2O, INC., El Segundo, CA (US)

( * ) Notice: Subject to any disclaimer, the term of this patent is extended or adjusted under 35 U.S.C. 154(b) by 168 days.

(21) Appl. No.: 14/730,131

(22) Filed: Jun. 3, 2015

(65) Prior Publication Data

US 2016/0355415 A1 Dec. 8, 2016

(51) Int. Cl.
*C02F 1/44* (2006.01)
*B01D 61/02* (2006.01)
(Continued)

(52) U.S. Cl.
CPC ........... *C02F 1/441* (2013.01); *B01D 69/125* (2013.01); *B01D 69/148* (2013.01); *B01D 71/56* (2013.01);
(Continued)

(58) Field of Classification Search
None
See application file for complete search history.

(56) References Cited

U.S. PATENT DOCUMENTS 3,231,597 A 1/1966 Fischer
3,291,660 A 12/1966 Oberth et al.
(Continued)

FOREIGN PATENT DOCUMENTS

WO 2004/056737 A1 7/2004
WO 2014/080426 A1 5/2014

OTHER PUBLICATIONS

Bazel; "The Effect of Solution Viscosity on the Flux and Rejection of Polyamide Membranes"; Thesis for Master of Science Degree; Ben-Gurion University of the Negev Jacob Institute for Desert Research; Sep. 2011; 65 Pages.
(Continued)

*Primary Examiner* — Krishnan S Menon
(74) *Attorney, Agent, or Firm* — Dentons US LLP

(57) ABSTRACT

Provided is an interfacial polymerization process for preparation of a highly permeable thin film composite membrane, which can be used for nanofiltration, forward osmosis, or reverse osmosis, particularly for use with brackish water at low energy conditions. The process includes contacting a porous support membrane with an aqueous phase containing a polyamine and a flux enhancing combination of additives that includes a metal chelate additive containing a bidentate ligand and a metal atom or metal ion and a phosphoramide to form a coated support membrane, and applying an organic phase containing a polyfunctional acid halide to the coated support membrane to interfacially polymerize the polyamine and the polyfunctional acid halide to form a discrimination layer of the thin film composite membrane. Also provided are the membranes prepared by the methods and reverse osmosis modules containing the membranes.

19 Claims, 1 Drawing Sheet

(51) Int. Cl.

| | |
|---|---|
| ***B01D 71/60*** | (2006.01) |
| ***B01D 67/00*** | (2006.01) |
| ***C02F 103/08*** | (2006.01) |
| ***B01D 69/12*** | (2006.01) |
| ***B01D 69/14*** | (2006.01) |
| ***B01D 71/56*** | (2006.01) |
| *B01D 63/10* | (2006.01) |

(52) U.S. Cl.
CPC ............ *B01D 61/025* (2013.01); *B01D 63/10* (2013.01); *C02F 2103/08* (2013.01)

(56) References Cited

U.S. PATENT DOCUMENTS

| | | | | |
|---|---|---|---|---|
| 3,926,798 | A | 12/1975 | Cadotte | |
| 4,039,440 | A | 8/1977 | Cadotte | |
| 4,214,994 | A | 7/1980 | Kitano et al. | |
| 4,277,344 | A | 7/1981 | Cadotte | |
| 4,337,154 | A | 6/1982 | Fukuchi et al. | |
| 4,482,736 | A | 11/1984 | Forster et al. | |
| 4,638,076 | A | 1/1987 | Bhattacharya | |
| 4,842,736 | A | 6/1989 | Bray et al. | |
| 4,855,048 | A | 8/1989 | Tang et al. | |
| 4,902,424 | A | 2/1990 | Wrasidlo | |
| 4,948,506 | A * | 8/1990 | Lonsdale ............. | B01D 69/122 210/490 |
| 4,948,507 | A | 8/1990 | Tomaschke | |
| 4,983,291 | A | 1/1991 | Chau et al. | |
| 5,108,607 | A | 4/1992 | Kraus et al. | |
| 5,543,046 | A | 8/1996 | Van Rijn | |
| 5,641,466 | A | 6/1997 | Ebbesen et al. | |
| 5,658,460 | A | 8/1997 | Cadotte et al. | |
| 6,153,133 | A | 11/2000 | Kaimai et al. | |
| 6,337,018 | B1 | 1/2002 | Mickols | |
| 6,437,189 | B1 | 8/2002 | Prasad et al. | |
| 6,783,745 | B1 | 8/2004 | Voronov et al. | |
| 7,064,214 | B2 | 6/2006 | Senanayake et al. | |
| 7,078,007 | B2 | 7/2006 | Yu et al. | |
| 7,109,140 | B2 | 9/2006 | Marand et al. | |
| 7,282,573 | B2 | 10/2007 | Chaudhuri et al. | |
| 7,422,667 | B1 | 9/2008 | Zhou et al. | |
| 7,490,725 | B2 | 2/2009 | Pinnau et al. | |
| 7,491,334 | B2 | 2/2009 | Comstock | |
| 7,648,765 | B2 | 1/2010 | Takahashi et al. | |
| 7,816,564 | B2 | 10/2010 | Balaban et al. | |
| 8,163,814 | B2 | 4/2012 | Emrick et al. | |
| 8,173,211 | B2 | 5/2012 | Shaffer et al. | |
| 8,177,978 | B2 | 5/2012 | Kurth et al. | |
| 8,505,743 | B2 | 8/2013 | Sarkar et al. | |
| 8,505,745 | B2 | 8/2013 | Mayes et al. | |
| 8,567,612 | B2 | 10/2013 | Kurth et al. | |
| 8,580,341 | B2 | 11/2013 | Wang et al. | |
| 8,733,558 | B2 * | 5/2014 | Mickols ............. | B01D 67/0093 210/490 |
| 8,754,139 | B2 * | 6/2014 | Allen ................... | B01D 61/025 521/25 |
| 8,801,935 | B2 * | 8/2014 | Koehler ............. | B01D 67/0079 210/490 |
| 8,828,533 | B2 | 9/2014 | Dai et al. | |
| 2008/0190836 | A1 | 8/2008 | Beppu et al. | |
| 2009/0050558 | A1 | 2/2009 | Ishizuka et al. | |
| 2011/0174728 | A1 | 7/2011 | Eisen et al. | |
| 2011/0189469 | A1 | 8/2011 | Stenzel et al. | |
| 2012/0080381 | A1 | 4/2012 | Wang et al. | |
| 2012/0292249 | A1 | 11/2012 | Wang et al. | |
| 2013/0199988 | A1 | 8/2013 | Jons et al. | |
| 2014/0014575 | A1 | 1/2014 | Kwon et al. | |
| 2014/0295079 | A1 | 10/2014 | Kurth et al. | |
| 2015/0086801 | A1 * | 3/2015 | Hiraki ...................... | B01J 20/02 428/500 |

OTHER PUBLICATIONS

Cahill et al.; "Microscopy and Microanalysis of Reverse-Osmosis and Nanofiltration Membranes" MRS Bulletin, vol. 33; (27-32); Jan. 2008; 6 Pages.

Chen et al.; "Novel Thin-Film Composite Membranes with Improved Water Flux from Sulfonated Cardo Poly(arylene ether sulfone) Bearing Pendant Amino Groups"; Journal of Membrane Sciences; 310 (2008) 102-109; 8 Pages.

Duan et al.; "Influence of Hexamethyl Phosphoramide on Polyamide Composite Reverse Osmosis Membrane Performance"; Separation and Purification Technology 75 (2010) 145-155; 11 Pages.

Gaid; "A Large Review of the Pre Treatment"; Expanding Issues in Desalination, Prof. Robert Y. Ning (Ed.), ISBN: 978-953-307-624-9, InTech, Available from: http://www.intechopen.com/books/expanding-issues-in-desalination/a-large-review-of-the-pre-treatment.; (2011); 55 Pages.

Ghosh et al.; "Impacts of Reaction and Curing Conditions on Polyamide Composite Reverse Osmosis Membrane Properties"; Journal of Membrane Science 311 (2008) 34-45; 12 Pages.

Gohil et al; "Development of High Flux Thin-Film Composite Membrane for Water Desalination: A Statistical Study Using Response Surface Methodology"; Desalination and Water Treatment (2014) 52:28-30, 5219-5228; 11 Pages.

Ikeda et al.; "Synthesis of Substituted Crown Ethers from Oligoethylene Glycols"; Journal of Organic Chemistry (1980) 45:5355-5358; 4 Pages.

Kim et al.; "Positron Annihilation Spectroscopic Evidence to Demonstrate the Flux-Enhancement Mechanism in Morphology-Controlled Thin-Film Composite (TFC) Membrane"; Environ. Sci. Technol. (2005) 39:1764-1770; 7 Pages.

Kochkodan et al.; "A Comprehensive Review on Surface Modified Polymer Membranes for Biofouling Mitigation" Desalination 356 (2015) 187-207; 21 Pages.

Kwak et al; "Structure-Motion-Performance Relationship of Flux-Enhanced Reverse Osmosis (RO) Membranes Composed of Aromatic Polyamide Thin Films"; Environ. Sci. Technol. (2001) 35:4334-4340; 7 Pages.

Kwak et al.; "Use of Atomic Force Microscopy and Solid-State NMR Spectroscopy to Characterize Structure-Property-Performance Correlation in High-Flux Reverse Osmosis (RO) Membranes"; Journal of Membrane Sciences; 158 (1999) 143-153; 11 Pages.

Lau et al.; "A Recent Progress in Thin Film Composite Membrane: A Review"; Desalination 287 (2012) 190-199; 10 Pages.

Liu et al.; "Thin-Film Composite Membrane Formed by Interfacial Polymerization of Polyvinylamine (PVAm) and Trimesoyl Chloride (TMC) for Nanofiltration"; Desalination; 288 (2012) 98-107; 10 Pages.

Saehan Industries Inc.; "Pilot Study for Evaluation of Saehan FRM RO Elements at Bedok Water Reclamation Plant, Singapore"; Project Report No. CAWT/2003/042/R; Singapore Utilities International Pte, Ltd., Aug. 2003; 13 Pages.

Tarboush et al.; "Recent Advances in Thin Film Composite (TFC) Reverse Osmosis and Nanofiltration Membranes for Desalination"; J. Applied Membrane Science & Technology, vol. 10, Dec. 2009, pp. 41-50; 10 Pages.

Tarboush et al.; "Preparation of thin-film-composite polyamide membranes for desalination using novel hydrophilic surface modifying macromolecules" I J. Membrane Science 325 (2008) 166-175; 10 Pages.

Tu et al.; "Boron Removal by Reverse Osmosis Membranes in Seawater Desalination Applications" Separation and Purification Technology 75 (2010) 87-101; 15 Pages.

Wend et al.; "Pretreatment for Membrane Water Treatment Systems: A Laboratory Study"; Water Research 37 (2003) 3367-3378; 12 Pages.

Xie et al.; "Polyamide Interfacial Composite Membranes Prepared from m-Phenylene Diamine, Trimesoyl Chloride and a new Disulfonated Diamine"; Journal of Membrane Science 403-404 (2012) 152-161; 10 Pages.

* cited by examiner

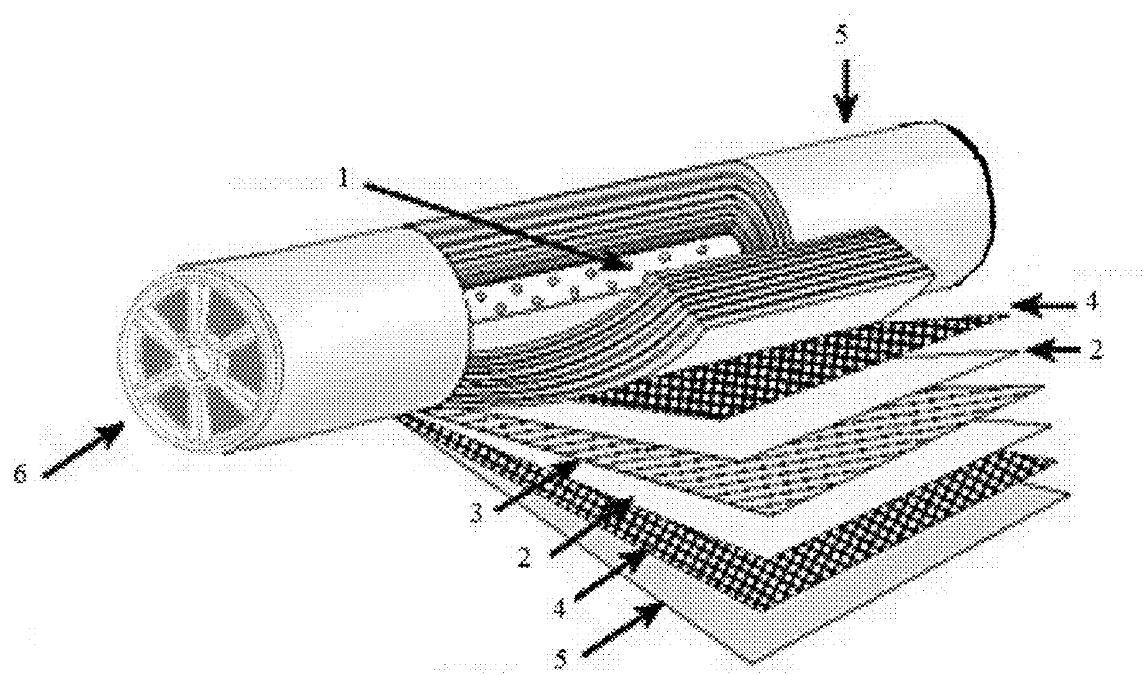
5
1
4
2
6
3
2
4
5

CHEMICAL ADDITIVES FOR ENHANCEMENT OF WATER FLUX OF A MEMBRANE

FIELD OF THE INVENTION

Provided are thin film composite (TFC) membranes and methods of preparing TFC membranes, including membranes used for nanofiltration, reverse osmosis or forward osmosis, to purify water, such as tap water, seawater, and brackish water, that achieve a high flux without a significant loss in salt rejection, and remain stable over long periods of time. In particular, provided are TFC membranes and methods of preparing the membranes that incorporate a combination of additives in the interfacial polymerization reaction that achieve a greater flux enhancement while maintaining salt rejection as compared to TFC membranes that do not incorporate the additives.

BACKGROUND

Thin film composite (TFC) membranes are frequently used in forward osmosis, reverse osmosis (RO), and nanofiltration systems for the purification of tap water, seawater and brackish water, ultra-pure water production, wastewater treatments, and separation of organics from aqueous streams. A variety of TFC membranes exist, including those developed from polymeric materials such as polyurea, polyamide, polyether, polyurea-amide, and aromatic polyamides. Commonly used TFC membranes are those made with a porous, highly permeable support such as polysulfone, which is coated with a cross-linked aromatic polyamide thin film. Performance of such membranes in terms of permeability, selectivity and antifouling performance predominantly depends on the properties of the membrane, particularly the thin film, or discriminating, layer.

Thus, there remains a need to develop TFC membranes, including reverse osmosis, forward osmosis, and nanofiltration membranes, that achieve high flux and exhibit maintained or improved rejection characteristics when used in the purification of water. Also desired are methods for making the membranes. Accordingly, it is among the objects herein to provide TFC membranes that achieve high flux and retain or exhibit improved rejection characteristics, and methods for making the membranes.

SUMMARY

Accordingly, the present invention is directed to chemical additives for thin film composite membranes that enhance the flux of the membranes while maintaining or improving salt rejection and that substantially obviate one or more of the problems due to limitations and disadvantages of the related art.

In one aspect, processes for the production of TFC membranes having increased flux and maintained or improved salt rejection are provided, where the process includes providing a porous support membrane, and contacting on the porous support membrane a first solution containing a polyamine, such as 1,3-diaminobenzene, and a combination of flux enhancing additives that includes a phosphoramide and a metal chelate additive that contains a bidentate ligand and a metal atom or metal ion, and with a second solution containing a polyfunctional acyl halide, e.g., trimesoyl chloride, where when the solutions are contacted, interfacial polymerization between the polyamine and the polyfunctional acid halide form a discrimination layer on the porous support membrane to form a highly permeable reverse osmosis membrane with increased flux, rejection and anti-fouling characteristics.

The invention can provide an interfacial polymerization process for preparing a highly permeable TFC membrane, such as an RO membrane, comprising: contacting on a porous support membrane: a) a first solution containing 1,3-diaminobenzene, and b) a second solution containing trimesoyl chloride, wherein at least one of solutions a) and b) contains a combination of flux enhancing additives that includes a phosphoramide and a metal chelate additive that contains a bidentate ligand and a metal atom or metal ion when said solutions are first contacted, and recovering a highly permeable membrane. In some embodiments, the first solution includes a polar solvent. In some embodiments, the polar solvent includes water. In some embodiments, the first solution is an aqueous solution. In some embodiments, the combination of flux enhancing additives that includes a phosphoramide and a metal chelate additive that contains a bidentate ligand and a metal atom or metal ion is in the first solution. In some embodiments, the second solution includes a non-polar organic solvent. In some embodiments, the combination of flux enhancing additives that includes a phosphoramide and a metal chelate additive that contains a bidentate ligand and a metal atom or metal ion is in the second solution.

An advantage of the present invention is that the highly permeable TFC membranes, such as RO membranes, produced by the provided methods can purify brackish water containing 2,000 ppm or less NaCl at low pressures. For example, modules containing membranes produced using the processes described herein can be used to produce a stream of potable water from brackish water at relatively low pressure conditions, i.e., not greater than about 225 psi, and in some embodiments at pressures of about 150 psi or less.

An advantage of these low pressure conditions is that pressure vessels, pumps, valves, and piping having a more moderate pressure rating than usually required for reverse osmosis systems can be used, thereby avoiding the cost of expensive high pressure rated systems. This substantially reduces the initial capital costs of the desalination system.

Another advantage is the reduction in operating costs compared to standard high pressure seawater desalination systems. Because the operating pressure is lower than that required for conventional high pressure seawater RO desalinization installations, the power costs are lower.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

Provided are processes for preparing a thin film composite membrane, such as a reverse osmosis membrane. An exemplary process includes preparing an aqueous phase containing a polyamine and a flux enhancing combination of additives that includes a metal chelate additive containing a bidentate ligand and a metal atom or metal ion and a phosphoramide, and preparing an organic phase containing a polyfunctional acid halide. The process further includes applying the aqueous phase to the surface of a porous support membrane to form a coated support membrane, and applying the organic phase to the coated support membrane to interfacially polymerize the polyamine and the polyfunctional acid halide to form a discrimination layer to form a reverse osmosis membrane, where the membrane includes the porous support membrane and the discrimination layer. The discrimination layer can be a composite polyamide membrane prepared by coating a porous support membrane with a polyfunctional amine monomer, most commonly coated from an aqueous phase solution. Although water is a preferred polar solvent, other solvents, such as lower monohydric alcohols, ketones, and acetonitrile can be used. A polyfunctional acid halide subsequently can be applied to the support membrane, typically from an organic phase solution.

In some embodiments, the polar solution is an aqueous phase containing a polyamine and is coated first on the porous support to form a coated support membrane, followed by applying the organic phase containing the acyl halide solution. The monomers can react when in contact, thereby polymerizing to produce a polymer (e.g., polyamide) discrimination layer at the upper surface of the support membrane. Interfacial polymerization of the polyamine and the polyfunctional acid halide form a discrimination layer thereby forming a reverse osmosis (RO) membrane, where the RO membrane includes the porous support membrane and the discrimination layer. The reverse osmosis membrane prepared by the process can be characterized by having a flux and a salt rejection that is greater than the flux and the salt rejection of a membrane prepared in the absence of the flux enhancing combination.

In some embodiments, the polyamine used in the process can be selected from the group consisting of diaminobenzene, triaminobenzene, m-phenylenediamine, p-phenylenediamine, 3,5-diaminobenzoic acid, 2,4-diaminotoluene, 2,4-diaminoanisole, xylylenediamine, ethylenediamine, propylenediamine, piperazine, and tris(2-diaminoethyl) amine. In some embodiments, the polyfunctional acid halide used in the process can be selected from the group consisting of trimesoyl chloride, trimellitic acid chloride, isophthaloyl chloride, and terephthaloyl chloride.

In some embodiments, the bidentate ligand used in the process can be selected from among:

Formula 1

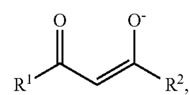

Formula 2

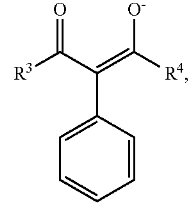

Formula 3

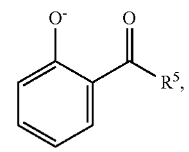

Formula 4

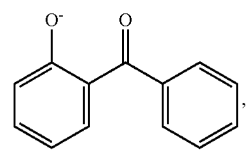

-continued

Formula 5

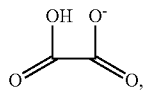

Formula 6

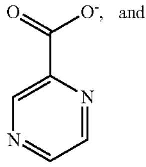

Formula 7

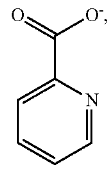

where each of $R^1$, $R^2$, $R^3$, $R^4$ and $R^5$ separately is selected from among a $C_1$-$C_{10}$ alkyl, a halogenated $C_1$-$C_{10}$ alkyl, a 5-membered or 6-membered aromatic ring, an aromatic bicyclic ring system containing two fused 6-membered rings, and an aromatic bicyclic ring system containing a 5-membered ring fused to a 6-membered aromatic ring. Each of $R^1$, $R^2$, $R^3$, $R^4$ and $R^5$ separately can be selected from among $C_1$-$C_6$ alkyl and halogenated $C_1$-$C_6$ alkyl. Any one of $R^1$, $R^2$, $R^3$, $R^4$ or $R^5$ can be selected from among phenyl, benzyl, a $C_1$-$C_5$ aromatic ring containing 1 to 4 hetero atoms selected from among N, O and S, and a $C_5$-$C_9$ bicyclic aromatic ring system containing 1 to 4 hetero atoms selected from among N, O and S. Any one of $R^1$, $R^2$, $R^3$, $R^4$ or $R^5$ can be selected from among furanyl, pyrrolyl, thiopheneyl, imidazolyl, pyrazolyl, oxazolyl, isoxazolyl, thiazolyl, phenyl, pyridinyl, pyrazinyl, pyrimidinyl, pyridazinyl, purinyl, benzoxazolyl, benzothiazolyl, benzisoxazolyl, benzimidazolyl, benzothiopheneyl, indazolyl, benzo[c]-thiopheneyl, isoindolyl, isobenzofuranyl, naphthaleneyl, quinolinyl, quinoxalinyl, quinazaolinyl, and isoquinolinyl.

The bidentate ligand can be an acetylacetonate (acac) or fluorinated acetylacetonate. In some embodiments, the metal chelate additive containing a bidentate ligand and a metal atom or metal ion can be selected from among $Al(acac)_3$, $Al(F_6acac)_3$, $Ba(acac)_2$, $Ba(F_6acac)_2$, $Be(acac)_2$, $Be(F_6acac)_2$, $Ca(acac)_2$, $Ca(F_6acac)_2$, $Cd(acac)_2$, $Cd(F_6acac)_2$, $Ce(acac)_3$, $Ce(F_6acac)_3$, $Cr(acac)_3$, $Co(acac)_3$, $Cu(acac)_2$, $Cu(F_6acac)_2$, $Dy(acac)_3$, $Er(acac)_3$, $Fe(acac)_2$, $Fe(acac)_3$, $Ga(acac)_3$, $Hf(acac)_4$, $In(acac)_3$, K(acac), Li(acac), $Mg(acac)_2$, $Mg(F_6acac)_2$, $Mn(acac)_2$, $Mn(acac)_3$, $MoO_2(acac)_2$, $MoO_2(F_6acac)_2$, Na(acac), $Nd(acac)_3$, $Nd(F_6acac)_3$, $Ni(acac)_2$, $Ni(F_6acac)_2$, $Pd(acac)_2$, $Pr(acac)_3$, $Pr(F_6acac)_3$, $Ru(acac)_3$, $Ru(F_6acac)_3$, $Sc(acac)_2$, $Sc(F_6acac)_2$, $Sm(acac)_3$, $Sn(acac)_2$, $Sn(acac)_2Cl_2$, t-butyl-Sn$(acac)_2$, t-butyl-Sn$(acac)_2Cl_2$, $Sn(F_6acac)_2$, $Sr(acac)_2$, $Sr(F_6acac)_2$, $Tb(acac)_3$, $V(acac)_3$, $Y(acac)_3$, $Y(F_6acac)_3$, $Zn(acac)_2$, $Zn(F_6acac)_2$, and $Zr(acac)_4$, where $F_6acac$ refers to 1,1,1,5,5,5-hexafluoroacetyl-acetonate.

In some embodiments, the bidentate ligand used in the process can be a beta-diketonate or a fluorinated beta-diketonate. For example, the bidentate ligand can be selected from among pentane-2,4-dionate; 1,5-difluoropentane-2,4-dionate; 1,1,5,5-tetrafluoropentane-2,4-dionate; 1,1,1,5,5,5-hexafluoropentane-2,4-dionate; propane-1,3-dionate; butane-1,3-dionate; 4-fluorobutane-1,3-dionate; 4,4-difluorobutane-1,3-dionate; 4,4,4-trifluorobutane-1,3-dionate;

heptane-3,5-dionate; 1-fluorohexane-2,4-dionate; 1,5-difluoropentane-2,4-dionate; 1,1,5-trifluoropentane-2,4-dionate; 1,1,5,5-tetrafluoropentane-2,4-dionate; 1,1,1,5,5-pentafluoropentane-2,4-dionate; 1,1,1,5,5,5-hexafluoropentane-2,4-dionate; and octane-3,5-dionate and combinations thereof. In some embodiments of the process, the amount of bidentate ligand in the metal chelate additive can yield a concentration of bidentate ligand in the aqueous phase of from about 0.001 wt % to about 1 wt %, based on the weight of the aqueous phase.

In the processes provided herein, the metal atom or metal ion of the metal chelate additive can be selected from Group 2 or Group 13 of the periodic table. In some embodiments, the metal atom or metal ion is an alkaline earth metal. For example, the metal atom or metal ion can be selected from the group consisting of beryllium (Be), magnesium (Mg), calcium (Ca), strontium (Sr), and barium (Ba). In some embodiments, the metal atom or metal ion is selected from the group consisting of aluminum (Al), gallium (Ga), and indium (In). The amount of metal atom or metal ion in the metal chelate additive can yield a concentration of metal atom or metal ion in the aqueous phase of from about 0.00001 wt % to about 1 wt %, based on the weight of the aqueous phase.

The amount of metal chelate additive in the flux enhancing combination of additives added to the aqueous phase can yield a concentration of metal chelate additive in the aqueous phase of from about 0.001 wt % to about 1 wt %, based on the weight of the aqueous phase.

In some embodiments, the phosphoramide used in the process can have the formula:

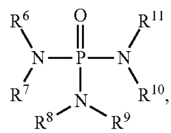

where each of $R^6$, $R^7$, $R^8$, $R^9$, $R^{10}$ and $R^{11}$ separately is selected from among hydrogen, a $C_1$-$C_{10}$ alkyl, a halogenated $C_1$-$C_{10}$ alkyl, a 5-membered aromatic ring, a 6-membered aromatic ring, an aromatic bicyclic ring system containing two fused 6-membered rings, and an aromatic bicyclic ring system containing a 5-membered ring fused to a 6-membered aromatic ring. In the processes provided herein, the amount of phosphoramide present in the flux enhancing combination of additives results in a concentration of phosphoramide in the aqueous phase of from about 0.1% to 4% based on the weight of the aqueous phase. Any phosphoramide can be selected. In some embodiments, the phosphoramide is a hexa($C_1$-$C_6$-alkyl) phosphoramide, such as hexamethylphosphoramide (HMPA).

The process further can include adding a processing aid selected from among a surfactant, a co-solvent, a drying agent, a catalyst or any combination thereof to the aqueous phase prior to applying the aqueous phase to the porous support membrane. The amount of processing aid in the aqueous phase can be from about 0.001 wt % to about 10 wt % based on the weight of the aqueous phase.

In some embodiments, the process further includes adding a surfactant to the aqueous phase prior to applying the aqueous phase to the porous support membrane. The surfactant can be selected from among nonionic, cationic, anionic, and zwitterionic surfactants. Exemplary surfactants include sodium lauryl sulfate (SLS), alkyl ether sulfates, alkyl sulfates, olefin sulfonates, alkyl ether carboxylates, sulfosuccinates, aromatic sulfonates, octylphenol ethoxylates, ethoxylated nonylphenols, alkyl poly(ethylene oxide), copolymers of poly(ethylene oxide) and poly(propylene oxide) (commercially called poloxamers or poloxamines), alkyl polyglucosides, e.g., octyl glucoside or decyl maltoside, fatty alcohols, e.g., cetyl alcohol or oleyl alcohol, cocamide MEA, cocamide DEA, alkyl hydroxyethyl dimethyl ammonium chloride, cetyltrimethylammonium bromide or chloride, hexadecyltrimethylammonium bromide or chloride, and alkyl betaines. Preferred among these are SLS, octylphenol ethoxylates, and ethoxylated nonylphenols. When present, the amount of surfactant in the aqueous phase can be from about 0.005 wt % to about 0.5 wt % based on the weight of the aqueous phase.

The co-solvent can be a polar aprotic solvent. Exemplary polar aprotic solvents include dimethylformamide, dimethylacetamide, tetrahydrofuran, dimethyl sulfoxide, 1,3-dimethyl-2-imidazolidinone, diethyl ether, N-methyl-2-pyrrolidone, dichloromethane, ethyl acetate, methyl acetate, isopropyl acetate, acetone, methyl ethyl ketone, methyl isobutyl ketone, acetonitrile and any combination thereof.

The processing aid can include a drying agent. A drying agent can be included in order to prevent loss of permeation of the discrimination layer upon drying. Any drying agent that does not interfere with the interfacial polymerization process can be used. Exemplary drying agents include a hydrocarbon, an ether, glycerin, citric acid, a glycol, glucose, sucrose, triethylammonium camphorsulfonate, triethylammonium benzenesulfonate, triethylammonium toluenesulfonate, triethylammonium methane sulfonate, ammonium camphor sulfonate, ammonium benzene sulfonate, and any combination thereof. When present, a drying agent can be present in the aqueous phase in an amount from about 0.001 wt % to about 10 wt % based on the weight of the aqueous phase.

In the processes provided herein, the aqueous phase or the organic phase or both can include nanoparticles. The nanoparticles can be zeolites or carbon nanoparticles (e.g., fullerenes or carbon nanotubes) or combinations thereof. When present, the nanoparticles can be present in the aqueous phase or in the organic phase or both in an amount from about 0.001 wt % to about 0.5 wt % based on the weight of the solution.

Also provided are thin film composite membranes, such as reverse osmosis membranes, prepared according to the processes provided herein. In some instances, the membrane can exhibit a flux of at least 20 gfd, 25 gfd, 30 gfd, or more, determined by exposing the membrane to deionized water containing 2,000 ppm NaCl at a temperature of 25° C. and a pressure of 150 psi. In some instances, the membrane can exhibit a salt rejection of at least 99.3%, determined by exposing the membrane to deionized water containing 2,000 ppm NaCl at a temperature of 25° C. and a pressure of 150 psi.

Also provided are methods of purifying seawater or brackish water. The brackish water can contain 2,000 ppm or less NaCl. In some instances, the methods include contacting brackish water with a thin film composite membrane, such as a reverse osmosis membrane, prepared by the processes described herein. A hydrostatic pressure is applied to the membrane by the water to be purified. In some instances, a hydrostatic pressure of about 225 psi or less is applied to the membrane via the seawater or brackish water. Low power methods also are provided. In these methods, a hydrostatic pressure of about 150 psi or less is applied to the membrane via the seawater or brackish water. Using membranes prepared by the methods provided herein, the methods of purifying seawater or brackish water can produce a flux of at least 20 gfd, such as at least 25 gfd, 30 gfd, 31 gfd, 32 gfd, or more.

Also provided are reverse osmosis elements that include a reverse osmosis membrane prepared by any of the methods described herein. In the element, the reverse osmosis membrane can be spirally wound around a central porous permeate collection tube.

BRIEF DESCRIPTION OF THE DRAWINGS

The accompanying drawing, which is included to provide a further understanding of the invention and is incorporated in and constitutes a part of this specification, illustrates an embodiment of the invention and together with the description serves to explain the principles of the invention.

In the drawings:

FIG. 1 is an exemplary embodiment of a wound module.

DETAILED DESCRIPTION

A. Definitions

Unless defined otherwise, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety. In the event that there are a plurality of definitions for terms herein, those in this section prevail. Where reference is made to a URL or other such identifier or address, it is understood that such identifiers can change and particular information on the internet can come and go, but equivalent information can be found by searching the internet. Reference thereto evidences the availability and public dissemination of such information.

As used herein, the singular forms "a," "an" and "the" include plural referents unless the context clearly dictates otherwise.

As used herein, ranges and amounts can be expressed as "about" a particular value or range. "About" also includes the exact amount. Hence "about 5 percent" means "about 5 percent" and also "5 percent." "About" means within typical experimental error for the application or purpose intended.

As used herein, "optional" or "optionally" means that the subsequently described event or circumstance does or does not occur, and that the description includes instances where said event or circumstance occurs and instances where it does not. For example, an optional component in a system means that the component may be present or may not be present in the system.

As used herein, the term "alkyl" refers to a straight, branched, or cyclic chain containing at least one carbon atom and no double or triple bonds between carbon atoms. The number of carbon atoms can be specified, for example, 1 to 6 carbon atoms, 2 to 5 carbon atoms, 3 to 4 carbon atoms, 2 to 6 carbon atoms, 3 to 6 carbon atoms, 2 to 4 carbon atoms and 1 to 5 carbon atoms. The number of carbon atoms can be represented, e.g., as $C_1$-$C_6$.

As used herein, $C_1$-$C_x$ includes $C_1$-$C_2$, $C_1$-$C_3$, $C_1$-$C_4$, $C_2$-$C_4$, . . . $C_1$-$C_x$.

As used herein, "aromatic ring" refers to a ring containing an array of $\pi$-molecular orbitals occupied by 4n+2 electrons, where n is an integer. Many aromatic rings or ring systems have 6 $\pi$-electrons. The aromatic ring can be a 5- or 6-membered monocyclic ring, or can be a bicyclic system, containing two or more fused 5- or 6-membered rings.

As used herein, "flux" refers to the amount of material that flows through a unit area per unit time, such as the amount of liquid flowing through a given membrane area during a given time. Generally, flux depends on the thickness of the membrane, the feed composition, the temperature of the feed, the downstream vacuum, and the feed-side pressure.

As used herein, a "combination" refers to any association between two items or among more than two items. The association can be spatial or refer to the use of the two or more items for a common purpose.

As used herein, a "flux enhancing combination" or "flux enhancing combination of additives" or "combination of flux enhancing additives" refer to a combination of at least two components that together improve the flux of a membrane.

As used herein, a "chelate" refers to a combination that includes a metal atom or ion and a chelating agent.

As used herein, a "chelating agent" refers to a chemical that can form two or more bonds to a single metal atom or ion.

As used herein, a "bidentate ligand" refers to a chelating agent that can form two bonds to a single metal atom or ion.

As used herein, a "metal chelate additive" is an additive that includes at least one bidentate ligand and a metal atom or metal ion.

As used herein, the term "surfactant" refers to molecules that absorb at the air/water, air/oil and/or oil/water interfaces, substantially reducing their surface energy. Surfactants generally are classified depending on the charge of the surface active moiety, and can be categorized as cationic, anionic, nonionic and amphoteric surfactants.

As used herein, a "thin film composite membrane" refers to a membrane that has layers of dissimilar materials joined together to form a single membrane.

As used herein, "halogenated" refers to the presence of one or more halogen substituents, such as fluorine, chlorine, bromine, or iodine or any combination thereof. For example, a halogenated $C_1$ alkyl can be any of $CH_2Cl$, $CHCl_2$, $CCl_3$, $CH_2F$, $CHF_2$, $CF_3$, $CH_2Br$, $CHBr_2$, $CBr_3$, $CH_2I$, $CHI_2$, or $CI_3$.

As used herein, the term "contacting" refers to bringing two or more materials into close enough proximity whereby they can interact.

As used herein, "gfd" refers to gallons/$ft^2$/day.

B. Thin Film Composite Membranes Containing Flux-Enhancing Additives

Provided are thin film composite (TFC) membranes produced by interfacial polymerization of monomers in two immiscible phases, e.g., a monomer in a non-polar (i.e., organic) phase with a monomer in a polar (i.e., aqueous) phase, on a porous support membrane and methods of preparing the TFC membranes. The provided TFC membranes contain additives in the aqueous phase or the organic phase or both, including a phosphoramide and a metal chelate additive containing a bidentate ligand and a metal atom or metal ion. By virtue of the combination of additives, the TFC membranes exhibit advantageous properties, such as, for example, enhanced flux and maintained or improved rejection characteristics when used, for example, in the purification of water, as compared to TFC membranes that do not contain the combination of additives.

In particular, the TFC membranes provided herein contain additives in the aqueous phase or organic phase or both that include a phosphoramide and a metal chelate additive containing a bidentate ligand and a metal atom or metal ion. The additives can be added together to one phase, e.g., both can be added to the aqueous phase or both can be added to the organic phase, or the additives can separately be added to the different phases. For example, in some embodiments, the phosphoramide and the metal chelate additive containing a bidentate ligand and a metal atom or metal ion both are added to the aqueous phase. In some embodiments, the phosphoramide and the metal chelate additive containing a bidentate ligand and a metal atom or metal ion both are added to the organic phase. In some embodiments, the phosphoramide and the metal chelate additive containing a bidentate ligand and a metal atom or metal ion both are added to the aqueous phase and the organic phase. In some embodiments, the phosphoramide is added to the aqueous phase and the metal chelate additive containing a bidentate ligand and a metal atom or metal ion is added to the organic phase. In some embodiments, the phosphoramide is added to the organic phase and the metal chelate additive containing a bidentate ligand and a metal atom or metal ion is added to the aqueous phase.

The TFC membranes are produced by interfacial polymerization of a polyamine monomer in the aqueous phase with a polyfunctional acyl halide monomer in the organic phase on a porous support membrane to form a thin selective layer on top of the substrate. The aqueous phase or organic phase or both contains between 0.1 wt % and 4 wt % phosphoramide and between 0.001 wt % and 1 wt % metal chelate additive containing a bidentate ligand and a metal atom or metal ion. The combination of additives, in particular the combination of a phosphoramide and metal chelate additive containing a bidentate ligand and a metal atom or metal ion, result in TFC membranes with increased flux and without significant loss to rejection that are stable under brackish water conditions as compared to TFC membranes that contain either a phosphoramide or a metal chelate additive containing a bidentate ligand and a metal atom or metal ion alone. Further description and examples of the TFC membranes and methods of producing the membranes are provided below.

It is shown herein that the TFC membranes described herein have advantageous properties compared to TFC membranes that are prepared using only one of a phosphoramide or a metal chelate additive containing a bidentate ligand and a metal atom or metal ion in the aqueous phase or organic phase or both. In particular, the TFC membranes provided herein use a combination of additives in the aqueous phase or organic phase or both that include a phosphoramide and a metal chelate additive containing a bidentate ligand and a metal atom or metal ion. It is shown herein that the TFC membranes that are prepared using both a phosphoramide and a metal chelate additive containing a bidentate ligand and a metal atom or metal ion in the aqueous phase or organic phase or both result in membranes that have increased flux and do not suffer a significant loss in rejection, as compared to membranes prepared using an aqueous phase or organic phase that does not contain a combination of a phosphoramide or a metal chelate additive containing a bidentate ligand and a metal atom or metal ion, such as an aqueous phase or organic phase that contains only one or no phosphoramide or metal chelate additive containing a bidentate ligand and a metal atom or metal ion. In addition, the membranes prepared using both a phosphoramide and a metal chelate additive containing a bidentate ligand and a metal atom or metal ion in the aqueous phase or organic phase or both are stable, for example, under brackish water conditions.

In addition, provided herein are methods of producing thin film composite membranes, such as via interfacial polymerization, that incorporate a combination of a phosphoramide and a metal chelate additive containing a bidentate ligand and a metal atom or metal ion in the aqueous phase or organic phase or both. Thus, provided herein are methods of producing such TFC membranes, such as methods that include incorporation of a combination of a phosphoramide and a metal chelate additive containing a bidentate ligand and a metal atom or metal ion in the aqueous phase or organic phase or both of an interfacial polymerization reaction on a porous support membrane, to produce TFC membranes that have enhanced flux and maintained or improved rejection characteristics when used, for example, in the purification of water, as compared to TFC membranes that do not contain the combination of additives.

1. Phosphoramide Additive

The TFC membranes provided herein contain one or more additives in the aqueous phase or organic phase or both of the interfacial polymerization reaction that forms the TFC membrane. An exemplary additive is a phosphoramide. Suitable phosphoramides for use in the membranes and methods provided herein include any phosphoramide that, when incorporated into the aqueous phase or organic phase or both of the interfacial polymerization reaction, maintains or improves the characteristics of the resulting membrane, including, but not limited to, flux, salt rejection, and stability.

Phosphoramide compounds suitable for use in the TFC membranes provided herein include compounds having the following general formula shown below:

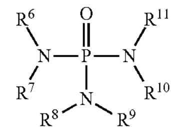

where each of $R^6$, $R^7$, $R^8$, $R^9$, $R^{10}$, and $R^{11}$ separately is selected from among hydrogen, a $C_1$-$C_{10}$ alkyl, a halogenated $C_1$-$C_{10}$ alkyl, a 5-membered or 6-membered aromatic ring, an aromatic bicyclic ring system containing two fused 6-membered rings, and an aromatic bicyclic ring system containing a 5-membered ring fused to a 6-membered aromatic ring. In some embodiments, each of $R^6$, $R^7$, $R^8$, $R^9$, $R^{10}$, and $R^{11}$ separately is selected from among hydrogen, $C_1$-$C_6$ alkyl and halogenated $C_1$-$C_6$ alkyl. In some embodiments, any one of $R^6$, $R^7$, $R^8$, $R^9$, $R^{10}$, or $R^{11}$ can be selected from among phenyl, benzyl, a $C_1$-$C_5$ aromatic ring containing 1 to 4 hetero atoms selected from among N, O and S, and a $C_5$-$C_9$ bicyclic aromatic ring system containing 1 to 4 hetero atoms selected from among N, O and S. In some embodiments, any one of $R^6$, $R^7$, $R^8$, $R^9$, $R^{10}$, or $R^{11}$ can be selected from among furanyl, pyrrolyl, thiopheneyl, imidazolyl, pyrazolyl, oxazolyl, isoxazolyl, thiazolyl, phenyl, pyridinyl, pyrazinyl, pyrimidinyl, pyridazinyl, purinyl, benzoxazolyl, benzothiazolyl, benzisoxazolyl, benzimidazolyl, benzothiopheneyl, indazolyl, benzo[c]thiopheneyl, isoindolyl, isobenzofuranyl, naphthaleneyl, quinolinyl, quinoxalinyl, quinazaolinyl, and isoquinolinyl. In some embodiments, each R can be a different group, e.g., an alkyl groups having a different number of carbon atoms, or can be the same group, e.g., each R is an alkyl group having the same number of carbon atoms.

Phosphoramides are well known in the art (see, e.g., U.S. Pat. Nos. 4,360,480 and 4,638,076, the disclosures of each of which are incorporated by reference) and are commercially available. In the provided phosphoramides, each R has between 1 and 10 carbon atoms, such as between 1 and 6 carbon atoms, and typically between 1 and 4 carbon atoms, such as 1, 2, 3, or 4 carbon atoms. Exemplary phosphoramides include, but are not limited to, hexamethylphosphoramide, hexaethylphosphoramide, hexapropylphosphoramide, and hexabutylphosphoramide. The phosphoramides include phosphoramides where each R group is the same, i.e., has the same number of carbon atoms. For example, an exemplary phosphoramide includes phosphoramides where each R group is, for example, 1 carbon, i.e., each R group is a methyl group, such as, for example, hexamethyl phosphoramide (HMPA). Exemplary of a phosphoramide is HMPA, a phosphoramide where each of $R^6$-$R^{11}$ is a methyl group (i.e., a $C_1$ alkyl). An exemplary HMPA includes the HMPA sold by Sigma Aldrich (St. Louis, Mo.).

Phosphoramides, such as HMPA, have been shown to enhance the flux of TFC membranes when used in the aqueous phase of an interfacial polymerization reaction (Duan et al. (2010) Sep. Purif. Technol. 75:145-155). In a bimolecular nucleophilic substitution ($S_N2$) reaction, such as the reaction between MPD and TMC, the film-forming rate can be greatly accelerated in the presence of a phosphoramide in the aqueous phase due to the ability of the electronegative oxygen atom of the phosphoramide to combine with reagent molecules to form highly active anions that are poorly solvated. Typically, the increase in flux is accompanied by a change in the chemical composition, hydrophilicity and surface morphology of the membrane. This in turn can adversely affect the antifouling performance and salt rejection characteristics of the membrane. However, in the methods and membranes provided herein, we have found that the presence of a phosphoramide, e.g., HMPA, in the membrane can increase the roughness (i.e., surface area) of the membrane and flux, while also decreasing rejection.

The phosphoramide can be included in the aqueous phase or organic phase of the interfacial polymerization reaction between a polyamine monomer and a polyfunctional acyl halide monomer on a porous support membrane in an amount from about or at 0.1 wt % to 4 wt %, typically, 0.25 wt % to 2 wt %, or 0.5 wt % to 1.5 wt %, or 1 wt % to 3.5 wt %, all inclusive by weight of the aqueous phase or organic phase. Typically, the amount of phosphoramide, for example, HMPA, included in the aqueous phase or organic phase of the interfacial polymerization reaction is between or between about 0.1 wt % and 4 wt %, inclusive, such as between or between about 0.1% and 0.25%, 0.1% and 0.5%, 0.1% and 0.75%, 0.1% and 1%, 0.1% and 1.25%, 0.1% and 1.5%, 0.1% and 1.75%, 0.1% and 2%, 0.1% and 2.25%, 0.1% and 2.5%, 0.1% and 3%, 0.1% and 3.5%, 0.1% and 4%, 0.25% and 0.5%, 0.25% and 0.75%, 0.25% and 1%, 0.25% and 1.25%, 0.25% and 1.5%, 0.25% and 1.75%, 0.25% and 2%, 0.25% and 2.25%, 0.25% and 2.5%, 0.25% and 3%, 0.25% and 3.5%, 0.25% and 4%, 0.5% and 0.75%, 0.5% and 1%, 0.5% and 1.25%, 0.5% and 1.5%, 0.5% and 1.75%, 0.5% and 2%, 0.5% and 2.25%, 0.5% and 2.5%, 0.5% and 3%, 0.5% and 3.5%, 0.5% and 4%, 0.75% and 1%, 0.75% and 1.25%, 0.75% and 1.5%, 0.75% and 1.75%, 0.75% and 2%, 0.75% and 2.25%, 0.75% and 2.5%, 0.75% and 3%, 0.75% and 3.5%, 0.75% and 4%, 1% and 1.25%, 1% and 1.5%, 1% and 1.75%, 1% and 2%, 1% and 2.25%, 1% and 2.5%, 1% and 3%, 1% and 3.5%, 1% and 4%, 1.25% and 1.5%, 1.25% and 1.75%, 1.25% and 2%, 1.25% and 2.25%, 1.25% and 2.5%, 1.25% and 3%, 1.25% and 3.5%, 1.25% and 4%, 1.5% and 1.75%, 1.5% and 2%, 1.5% and 2.25%, 1.5% and 2.5%, 1.5% and 3%, 1.5% and 3.5%, 1.5% and 4%, 1.75% and 2%, 1.75% and 2.25%, 1.75% and 2.5%, 1.75% and 3%, 1.75% and 3.5%, 1.75% and 4%, 2% and 2.25%, 2% and 2.5%, 2% and 3%, 2% and 3.5%, 2% and 4%, 2.25% and 2.5%, 2.25% and 3%, 2.25% and 3.5%, 2.25% and 4%, 2.5% and 3%, 2.5% and 3.5%, 2.5% and 4%, 3% and 3.5%, 3% and 4%, and 3.5% and 4% phosphoramide, by weight of the aqueous phase or organic phase. Generally, the aqueous phase or organic phase contains less than 4 wt % phosphoramide. For example, the aqueous phase or organic phase of the interfacial polymerization reactions described herein contain at least or about at least 0.1%, 0.25%, 0.5%, 0.75%, 1%, 1.25%, 1.5%, 1.75%, 2%, 2.25%, but less than at or about 4 wt % phosphoramide.

In some examples, the aqueous phase or organic phase or both includes between or between about 0.1-4 wt % of a phosphoramide, e.g., HMPA, such as, for example, 0.25, 0.5, 0.75, 1, 1.25, 1.5, 2, 2.5, 3, 3.5, 4% HMPA, by weight of the aqueous phase or organic phase.

2. Metal Chelate Additive

The combination of additives provided herein includes a metal chelate additive containing a bidentate ligand and a metal atom or metal ion. Any bidentate ligand that can form a complex with a metal atom or metal ion can be used in the metal chelate additive. A bidentate ligand can be a Lewis base that can donate electrons to a metal atom. Exemplary bidentate ligands include:

Formula 1

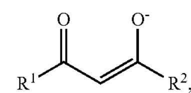

Formula 2

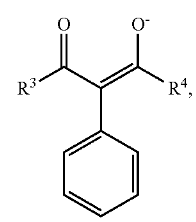

Formula 3

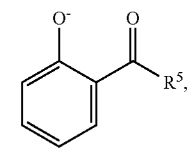

Formula 4

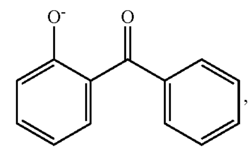

Formula 5

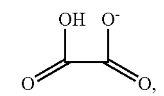

-continued

Formula 6

Formula 7

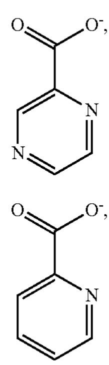

where each of $R^1$, $R^2$, $R^3$, $R^4$ and $R^5$ separately is selected from among a $C_1$-$C_{10}$ alkyl, a halogenated $C_1$-$C_{10}$ alkyl, a 5-membered or 6-membered aromatic ring, an aromatic bicyclic ring system containing two fused 6-membered rings, and an aromatic bicyclic ring system containing a 5-membered ring fused to a 6-membered aromatic ring. In some embodiments, each of $R^1$, $R^2$, $R^3$, $R^4$ and $R^5$ separately is selected from among $C_1$-$C_6$ alkyl and halogenated $C_1$-$C_6$ alkyl. In some embodiments, any one of $R^1$, $R^2$, $R^3$, $R^4$ or $R^5$ can be selected from among phenyl, benzyl, a $C_1$-$C_5$ aromatic ring containing 1 to 4 hetero atoms selected from among N, O and S, and a $C_5$-$C_9$ bicyclic aromatic ring system containing 1 to 4 hetero atoms selected from among N, O and S. In some embodiments, any one of $R^1$, $R^2$, $R^3$, $R^4$ or $R^5$ can be selected from among furanyl, pyrrolyl, thiopheneyl, imidazolyl, pyrazolyl, oxazolyl, isoxazolyl, thiazolyl, phenyl, pyridinyl, pyrazinyl, pyrimidinyl, pyridazinyl, purinyl, benzoxazolyl, benzothiazolyl, benzisoxazolyl, benzimidazolyl, benzothiopheneyl, indazolyl, benzo[c]thiopheneyl, isoindolyl, isobenzofuranyl, naphthaleneyl, quinolinyl, quinoxalinyl, quinazaolinyl, and isoquinolinyl.

Among the preferred bidentate ligands are the unsubstituted and halogen-substituted beta-diketonates of Formula 1, such as an acetylacetonate ion (often abbreviated as "acac" and also known as pentane-2,4-dionate) or halogenated acetylacetonate ion. One or more bidentate ligands can interact with a metal ion to form a metal chelate. For example, when the metal ion is an alkaline earth metal, two bidentate ligands can interact with the metal to form a metal chelate. Exemplary metal chelate additives include: i) two acetylacetonate ligands and a Sr atom (Structure A); ii) two fluoroacetylacetonate ligands and a Sr atom (Structure B); and iii) two oxalate ligands and a Sr atom (Structure C):

Structure A

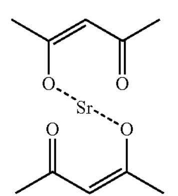

Structure B

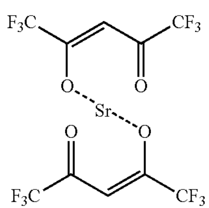

-continued

Structure C

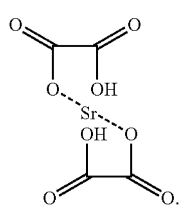

In some embodiments, the metal species and the ligands are selected to form a chelate that is dissolvable to some extent in the aqueous phase layer. In some applications, the chelate includes at least one bidentate ligand.

In some embodiments, the metal complex includes an unsubstituted or halogen-substituted beta-diketonate. Exemplary beta-diketonate ligands include pentane-2,4-dionate (acetylacetonate, often abbreviated as "acac"); 1,5-difluoropentane-2,4-dionate; 1,1,5,5-tetrafluoropentane-2,4-dionate; 1,1,1,5,5,5-hexafluoropentane-2,4-dionate; propane-1,3-dionate; butane-1,3-dionate; 4-fluorobutane-1,3-dionate; 4,4-difluorobutane-1,3-dionate; 4,4,4-trifluorobutane-1,3-dionate; heptane-3,5-dionate; 1-fluorohexane-2,4-dionate; 1,5-difluoropentane-2,4-dionate; 1,1,5-trifluoropentane-2,4-dionate; 1,1,5,5-tetrafluoropentane-2,4-dionate; 1,1,1,5,5-pentafluoropentane-2,4-dionate; 1,1,1,5,5,5-hexafluoropentane-2,4-dionate; and octane-3,5-dionate ligands.

The ligand can be bound to any element selected from Groups 2-15 of the Periodic Table (IUPAC) to form the chelate. In some embodiments, the ligand is bound to an element selected from among Groups 3-15 and Rows 3-6 of the Periodic Table (IUPAC), preferably Groups 3-14 and Rows 3-6 of the Periodic Table. In some embodiments, the ligand is bound to a metal atom or metal ion selected from among the group consisting of aluminum, beryllium, cadmium, calcium, cerium, chromium, cobalt, copper, dysprosium, erbium, gallium, hafnium, indium, iron, lithium, magnesium, manganese, molybdenum, neodymium, nickel, palladium, potassium, praseodymium, ruthenium, samarium, scandium, sodium, strontium, terbium, tin, vanadium, yttrium, ytterbium, zinc, and zirconium. In some embodiments, the metal can be a Group 2 (alkaline earth, such as beryllium (Be), magnesium (Mg), calcium (Ca), strontium (Sr), and barium (Ba)) or Group 13 (aluminum (Al), gallium (Ga), indium (In) or thallium (Tl)) metal ion or metal atom.

Metal chelates containing bidentate ligands and metal atoms or metal ions are well known in the art, as are methods for forming the metal chelates (e.g., see U.S. Pat. Nos. 3,231,597; 3,291,660; and 7,282,573; and International Patent Application Publication WO 2004/056737, the disclosures of each of which are incorporated by reference). For example, metal acetylacetonates can be formed by the reaction of excess acetylacetone or a solution of a solid salt of acetylacetone in an inert solvent, followed by refluxing with the metal oxide, hydroxide, carbonate or basic carbonate of the metal. Metal acetylacetonates also can be prepared in a nonaqueous solution by the reaction of a metal salt and acetylacetone if the metal salts are soluble in the nonaqueous solvent. Metal acetylacetonates also can be formed by the reaction of acetylacetone with a metal oxide, hydroxide, carbonate or basic carbonate in aqueous solution, with or without pH control or added heat. Metal acetylacetonates also can be prepared in an anhydrous inert medium containing the ligand and metal, particularly alkali metals and alkaline earth metals. Any of these synthesis techniques can be used to prepare the metal chelates of the flux enhancing combination of additives provided herein.

The amount of metal atom or metal ion in the metal chelate additive can be selected to yield a concentration in the aqueous phase or organic phase of from about 0.00001 wt % to about 1 wt %, based on the weight of the aqueous phase or organic phase. In some embodiments, the amount of metal atom or metal ion in the metal chelate additive can be selected to yield a concentration in the aqueous phase or organic phase of from about 0.0001 wt % to about 1 wt %, or 0.001 wt % to about 0.5 wt %, based on the weight of the aqueous phase or organic phase.

In some embodiments, preferred species of the metal chelate additive containing a bidentate ligand and a metal atom or metal ion include Al(acac)$_3$, Al(F$_6$acac)$_3$, Ba(acac)$_2$, Ba(F$_6$acac)$_2$, Be(acac)$_2$, Be(F$_6$acac)$_2$, Ca(acac)$_2$, Ca(F$_6$acac)$_2$, Cd(acac)$_2$, Cd(F$_6$acac)$_2$, Ce(acac)$_3$, Ce(F$_6$acac)$_3$, Cr(acac)$_3$, Co(acac)$_3$, Cu(acac)$_2$, Cu(F$_6$acac)$_2$, Dy(acac)$_3$, Er(acac)$_3$, Fe(acac)$_2$, Fe(acac)$_3$, Ga(acac)$_3$, Hf(acac)$_4$, In(acac)$_3$, K(acac), Li(acac), Mg(acac)$_2$, Mg(F$_6$acac)$_2$, Mn(acac)$_2$, Mn(acac)$_3$, MoO$_2$(acac)$_2$, MoO$_2$(F$_6$acac)$_2$, Na(acac), Nd(acac)$_3$, Nd(F$_6$acac)$_3$, Ni(acac)$_2$, Ni(F$_6$acac)$_2$, Pd(acac)$_2$, Pr(acac)$_3$, Pr(F$_6$acac)$_3$, Ru(acac)$_3$, Ru(F$_6$acac)$_3$, Sc(acac)$_2$, Sc(F$_6$acac)$_2$, Sm(acac)$_3$, Sn(acac)$_2$, Sn(acac)$_2$Cl$_2$, t-butyl-Sn(acac)$_2$, t-butyl-Sn(acac)$_2$Cl$_2$, Sn(F$_6$acac)$_2$, Sr(acac)$_2$, Sr(F$_6$acac)$_2$, Tb(acac)$_3$, V(acac)$_3$, Y(acac)$_3$, Y(F$_6$acac)$_3$, Zn(acac)$_2$, Zn(F$_6$acac)$_2$, and Zr(acac)$_4$, where F$_6$acac refers to 1,1,1,5,5,5-hexafluoropentane-2,4-dionate or 1,1,1,5,5,5-hexafluoroacetylacetonate.

The amount of metal chelate additive containing a bidentate ligand and a metal atom or metal ion in the combination of additives can be selected to yield a concentration in the aqueous phase or organic phase of from about 0.001 wt % to about 1 wt %, based on the weight of the aqueous phase or organic phase. In some embodiments, the amount of metal chelate additive containing a bidentate ligand and a metal atom or metal ion in the combination of additives can be selected to yield a concentration in the aqueous phase or organic phase of about 0.001 wt %, 0.005 wt %, 0.01 wt %, 0.0125 wt %, 0.015 wt %, 0.0175 wt %, 0.02 wt %, 0.0225 wt %, 0.025 wt %, 0.0275 wt %, 0.03 wt %, 0.0325 wt %, 0.035 wt %, 0.0375 wt %, 0.04 wt %, 0.0425 wt %, 0.045 wt %, 0.0475 wt %, 0.05 wt %, 0.0525 wt %, 0.055 wt %, 0.0575 wt %, 0.06 wt %, 0.0625 wt %, 0.065 wt %, 0.0675 wt %, 0.07 wt %, 0.0725 wt %, 0.075 wt %, 0.0775 wt %, 0.08 wt %, 0.0825 wt %, 0.085 wt %, 0.0875 wt %, 0.09 wt %, 0.0925 wt %, 0.095 wt %, 0.0975 wt %, 0.1 wt %, 0.2 wt %, 0.3 wt %, 0.4 wt %, 0.5 wt %, 0.6 wt %, 0.7 wt %, 0.8 wt %, 0.9 wt % or 1 wt %, based on the weight of the aqueous phase or organic phase, or that results in a concentration in the aqueous phase or organic phase in a range of at or about c to at or about d, where c is any one of the preceding wt % values of metal chelate additive, and d is any one of the preceding wt % values of metal chelate additive that is >c, such as from about 0.005 wt % to about 0.0625 wt %, or from about 0.025 wt % to about 0.575 wt %, or from about 0.01 wt % to about 0.07 wt %, or from about 0.04 wt % to about 0.4 wt %, etc. In some embodiments, at least 0.01 wt % metal chelate additive containing a bidentate ligand and a metal atom or metal ion is present in the aqueous phase or organic phase. In some embodiments, at least 0.05 wt % metal chelate additive containing a bidentate ligand and a metal atom or metal ion is present in the aqueous phase or organic phase.

In some embodiments, the methods provided herein include adding a combination of a phosphoramide and metal chelate additive containing a bidentate ligand and a metal atom or metal ion to the aqueous phase or organic phase or both, resulting in a ratio of phosphoramide to metal chelate additive in the aqueous phase or organic phase or both of from about 50:1 to about 0.5:1. In some embodiments, the ratio of phosphoramide to metal chelate additive in the aqueous phase or organic phase or both is about 50:1, or 40:1, or 30:1, or 25:1, or 20:1, or 15:1, or 10:1, or 9:1, or 8:1, or 7:1, or 6:1, or 5:1, or 4:1, or 3:1, or 2:1, or 1:1, or 0.5:1.

The combination of additives that includes a phosphoramide and a metal chelate additive containing a bidentate ligand and a metal atom or metal ion can be added to the aqueous phase. The combination of additives that includes a phosphoramide and a metal chelate additive containing a bidentate ligand and a metal atom or metal ion can be added to the organic phase. The phosphoramide and the metal chelate additive can be added in combination or sequentially in any order.

C. Other Additives

In the processes provided herein, the aqueous phase or organic phase of the interfacial polymerization reaction can include other additives in addition to the flux enhancing combination of additives that includes a phosphoramide and a metal chelate additive containing a bidentate ligand and a metal atom or metal ion described herein. For example, the aqueous phase or organic phase or both can include nanoparticles, including insoluble carriers, and processing aids, such as surfactants, co-solvents such as polar aprotic solvents, drying agents, catalysts, co-reactants, or any combination thereof. Drying agents can include, for example, hydrophobic organic compounds, such as a hydrocarbon or an ether, glycerin, citric acid, glycols, glucose, sucrose, triethylammonium camphorsulfonate, triethylammonium benzenesulfonate, triethylammonium toluenesulfonate, triethylammonium methane sulfonate, ammonium camphor sulfonate, and ammonium benzene sulfonate, and those described in U.S. Pat. Nos. 4,855,048; 4,948,507; 4,983,291; and 5,658,460.

1. Nanoparticles

In some embodiments, nanoparticles or carriers, for example, carriers that are relatively insoluble, can be included in the TFC membrane. The nanoparticles or relatively insoluble carriers or both can be processed using shear, cavitation, or impact forces prior to addition to the aqueous phase or organic phase or both. The nanoparticles or carriers also can be calcined for at least 1 hour at 200° C. or more prior to use. Carriers also can be processed by subjecting them to ultrasonic energy prior to use.

The nanoparticles or carriers can be processed to adjust the pH prior to use. For example, the nanoparticles or carriers or both can be processed in a solution at a pH lower than about 6 for at least 30 seconds or at a pH lower than about 5 for at least 30 seconds. The nanoparticles or carriers can be processed in a solution at a pH greater than about 8 for at least 30 seconds or in a solution at a pH greater than about 9 for at least 30 seconds. The nanoparticles or carriers or both also can be processed with heat in a solution for at least 5 minutes at a temperature of 40° C. or more.

Nanoparticles or carriers can be included in the support layer, the organic phase, the aqueous phase, both the aqueous phase and the organic phase, or in the support layer. Nanoparticles or carriers also can be present in the water-wetted surface of the support membrane prior to interfacial polymerization between the monomers in the aqueous phase and the monomers in the organic phase. Nanoparticles, such as zeolites, particularly LTA (Linde Type A), can be added to the support membrane to improve functionality, e.g., by making the membrane more resistant to compaction.

Nanoparticles or carriers can include a metal particle, such as gold, silver, copper, zinc, titanium, iron, aluminum, zirconium, indium, tin, magnesium, or calcium or an alloy thereof, an oxide thereof, or a combination thereof. They can also be a nonmetallic species such as $Si_3N_4$, SiC, BN, $B_4C$, or TiC or an alloy thereof or a combination thereof. They can be a carbon-based species such as graphite, carbon glass, a carbon cluster of at least $C_2$, a carbon nanotube, a carbon nanoparticle, a buckminsterfullerene, a higher fullerene, or a combination thereof.

Suitable zeolites for use as nanoparticles include LTA (Linde Type A), LTL (Linde Type L), OFF (offretite), RHO, PAU, and KFI. Such zeolites have different Si/Al ratios, and exhibit different characteristic charge and hydrophilicity and can therefore be selected to be included in RO membranes in different circumstances. Nanoparticles also can include zeolite precursors or amorphous aluminosilicates.

Zeolites can be crystalline aluminosilicates with fully cross-linked, open framework structures made up of corner-sharing $SiO_4$ and $AlO_4$ tetrahedra. A representative empirical formula of a zeolite is $M_{2/n}O.Al_2O_3xSiO_2yH_2O$ where M represents the exchangeable cation of valence n. M is generally a Group I or II ion, although other metal, non-metal, and organic cations can also balance the negative charge created by the presence of Al in the structure. The framework can contain interconnected cages and channels of discrete size, which can be occupied by water. In addition to $Si^{4+}$ and $Al^{3+}$, other elements also can be present in the zeolitic framework. They need not be isoelectronic with $Si^{4+}$ or $Al^{3+}$, but are able to occupy framework sites. Aluminosilicate zeolites typically display a net negative framework charge, but other molecular sieve frameworks can be electrically neutral.

Aluminosilicate zeolites with an Si:Al ratio less than 1.5:1 are preferred. Other preferred minerals include aluminite, alunite, ammonia alum, anauxite, apjohnite, basaluminite, batavite, bauxite, beidellite, boehmite, cadwaladerite, cardenite, chalcoalumite, chiolite, chloraluminite, cryolite, dawsonite, diaspore, dickite, gearksutite, gibbsite, halloysite, hydrobasaluminite, hydrocalumite, hydrotalcite, illite, kalinite, kaolinite, mellite, montmorillonite, natroalunite, nontronite, pachnolite, prehnite, prosopite, ralstonite, ransomite, saponite, thomsenolite, weberite, woodhouseite, and zincaluminite and combinations thereof.

Zeolites and other inorganic mineral compounds also can be selected based on the degree of crystallization. Amorphous portions of the nanoparticle are typically more soluble than crystalline portions of the nanoparticle and processing can increase solubility. The amount of crystalline material can be determined through several techniques including x-ray crystallography. The nanoparticles can have a structure with greater than 0.5%, 1% or 5% amorphous material by mass within the particle and may have a surface containing at least 40% of aluminum atoms or oxygen atoms directly bound to aluminum atoms.

Minerals that have cage-like framework structures similar to zeolites or have similar properties include the phosphates: kehoeite, pahasapaite and tiptopite; and the silicates: hsianghualite, lovdarite, viseite, partheite, prehnite, roggianite, apophyllite, gyrolite, maricopaite, okenite, tacharanite and tobermorite. Accordingly, minerals similar to zeolites also can be molecular sieves based on $AlPO_4$. These aluminophosphates, silicoalumino-phosphates, metalloaluminophosphates and metallosilicoaluminophosphates are denoted as $AlPO_{4-n}$, $SAPO_{-n}$, $MeAPO_{-n}$ and $MeAPSO_{-n}$, respectively, where n is an integer indicating the structure type. $AlPO_4$ molecular sieves can have the structure of known zeolites or other structures. When Si is incorporated in an $AlPO_{4-n}$ framework, the product can be known as SAPO. MeAPO or MeAPSO sieves can be formed by the incorporation of a metal atom (Me) into an $AlPO_{4-n}$ or SAPO framework. Exemplary metal atoms include Li, Be, Mg, Co, Fe, Mn, Zn, B, Ga, Fe, Ge, Ti, and As.

Most substituted $AlPO_{4-n}$'s have the same structure as $AlPO_{4-n}$, but several new structures are only found in SAPO, MeAPO and MeAPSO materials. Their frameworks typically carry an electric charge.

Non-zeolite nanoparticles and or other relatively insoluble carriers can be selected from a list of inorganic mineral compounds that have a solubility product such that preferred concentrations of dissolved molecular additives can be achieved. For many compounds, these solubility products (Ksp) are well known. For compounds where these are not known experimentally, molecular additive-releasing or other relatively insoluble carriers also can be selected by their counter ion. In such cases, compounds can be selected based on the presence of sulfate, hydroxide or oxide counterions. Solubility of these non-zeolite nanoparticles or other relatively insoluble carriers can be enhanced using processing.

Particle size is often described in terms of average hydrodynamic diameter, assuming a spherical shape of the nanoparticles or carriers. The nanoparticle carrier can have an average hydrodynamic diameter of from about 0.1 nm to about 1000 nm, from about 10 nm to about 1000 nm, from about 20 nm to about 1000 nm, from about 50 nm to about 1000 nm, from about 0.1 nm to about 500 nm, from about 10 nm to about 500 nm, from about 50 nm to about 250 nm, from about 200 nm to about 300 nm, or from about 50 nm to about 500 nm.

The nanoparticles or carriers can be dispersed in a solution compatible with the aqueous or polar solvent that will be used during interfacial polymerization. In some applications, water can be used as both the dispersion solvent for the nanoparticles or carriers and as the aqueous solvent for use during the interfacial polymerization. This dispersion largely includes isolated and individual nanoparticles or carriers. Suitable methods for dispersion include stirring, ultrasonication, shaking, use of surfactants or co-solvents, use of a Microfluidizer™ high shear fluid processors (Microfluidics Corp., Westwood, Mass., USA), use of a homogenizer, use of a mortar and pestle, use of a ball mill or use of a jar mill. In some applications, some of the nanoparticles or carriers may still be associated with other nanoparticles or carrier particles as aggregates. These aggregates can be left in solution, or can removed by a suitable technique, such as filtration.

When present, the amount of nanoparticles in the aqueous phase or organic phase is from about 0.001 wt % to about 0.5 wt % based on the weight of the aqueous phase or organic phase. In some embodiments, the aqueous phase or organic phase contains an amount of nanoparticles from about 0.005 wt % to about 0.1 wt % based on the weight of the aqueous phase or organic phase.

2. Processing Aids

In some embodiments, the aqueous phase or organic phase can include processing aids, such as surfactants, co-solvents such as polar aprotic solvents, drying agents, catalysts, co-reactants, or any combination thereof. When present, a processing aid can be present in the aqueous phase or organic phase in an amount from about 0.001 wt % to about 10 wt % based on the weight of the aqueous phase or organic phase.

a. Surfactants

In some embodiments, the aqueous phase of surfactants. The surfactants can, for example, help the aqueous phase wet the support layer or can help in the dispersion of materials, e.g., nanoparticles, in the aqueous phase. The surfactant(s) can be selected from among nonionic, cationic, anionic, and zwitterionic surfactants depending on the chemistry of the other additives. For example, a cationic surfactant would not be selected when anionic additives are being used. Exemplary surfactants include sodium lauryl sulfate (SLS), alkyl ether sulfates, alkyl sulfates, olefin sulfonates, alkyl ether carboxylates, sulfosuccinates, aromatic sulfonates, octylphenol ethoxylates, ethoxylated nonylphenols, alkyl poly(ethylene oxide), copolymers of poly (ethylene oxide) and poly(propylene oxide) (commercially called poloxamers or poloxamines), alkyl polyglucosides, e.g., octyl glucoside or decyl maltoside, fatty alcohols, e.g., cetyl alcohol or oleyl alcohol, cocamide MEA, cocamide DEA, alkyl hydroxyethyldimethylammonium chloride, cetyltrimethylammonium bromide or chloride, hexadecyltrimethylammonium bromide or chloride, and alkyl betaines. Preferred among these are SLS, octylphenol ethoxylates, and ethoxylated nonylphenols.

When present, the amount of surfactant in the aqueous phase is from about 0.005 wt % to about 0.5 wt % based on the weight of the aqueous phase. In some embodiments, the aqueous phase contains no surfactant. In some embodiments, the aqueous phase contains an amount of surfactant from about 0.01 wt % to about 0.1 wt % based on the weight of the aqueous phase.

b. Triethylammonium Camphorsulfonate (TEACSA)

In some embodiments, the aqueous phase of the interfacial polymerization reaction can include triethylammonium camphorsulfonate (TEACSA). When present, the TEACSA is present in an amount from about 4 wt % to about 10 wt % based on the weight of the aqueous phase. In some embodiments, the TEACSA is present in the aqueous phase in an amount from about 5 wt % to about 7.5 wt %. In some embodiments, the amount of TEACSA in the aqueous phase is about 4 wt %, 4.25 wt %, 4.5 wt %, 4.75 wt %, 5 wt %, 5.25 wt %, 5.5 wt %, 5.75 wt %, 6 wt %, 6.25 wt %, 6.5 wt %, 6.75 wt %, 7 wt %, 7.25 wt %, 7.5 wt %, 7.75 wt %, 8 wt %, 8.25 wt %, 8.5 wt %, 8.75 wt %, 9 wt %, 9.25 wt %, 9.5 wt %, 9.75 wt %, or 10 wt % based on the weight of the aqueous phase, or an amount in a range of at or about e to at or about f, where e is any one of the preceding wt % values of TEACSA, and f is any one of the preceding wt % values of TEACSA that is >e, such as from about 5 wt % to about 10 wt %, or from about 4.25 wt % to about 7.75 wt %, or from about 5 wt % to about 7 wt %, etc. In some embodiments, the TEACSA is present in the aqueous phase in an amount of about 6.75 wt %.

c. Catalysts

Catalysts can be included in the aqueous phase. In some embodiments, a catalyst can include diethylamine, triethylamine, ethylene diamine, triethanolamine, diethanolamine, ethanolamine, dimethylaminopyridine, or combinations thereof. In some embodiments, the catalyst can be an acid catalyst or a base catalyst. An acid catalyst can be an inorganic acid, an organic acid, a Lewis acid, or a quaternary ammonium salt or an acid salt of ammonia or a primary, secondary or tertiary amine. Exemplary acid catalysts include hydrochloric acid, nitric acid, sulfuric acid, an aliphatic sulfonic acid, an aromatic sulfonic acid, a carboxylic acid, a fluorinated carboxylic acid, such as trifluoroacetic acid, a cycloaliphatic sulfonic acid, boric acid, tetrafluoroboric acid, an aluminum trihalide, an aluminum trialkoxide, a boron trihalide, such as a boron trifluoride, a tin tetrahalide, such as tin tetrachloride and zinc tetrafluoroborate.

Exemplary base catalysts include alkoxide salts, such as sodium ethoxide; hydroxide salts, such as sodium hydroxide and potassium hydroxide; carbonate salts, such as potassium carbonate; phosphate salts, such as trisodium phosphate; phenoxide salts, such as sodium phenoxide; borate salts, such as sodium borate; carboxylate salts, such as potassium acetate; ammonia; and primary, secondary and tertiary amines.

When present, the amount of catalyst in the aqueous phase is from about 0.001 wt % to about 0.5 wt % based on the weight of the aqueous phase. In some embodiments, the aqueous phase contains an amount of catalyst from about 0.005 wt % to about 0.25 wt % based on the weight of the aqueous phase.

D. Preparation of TFC Membranes

Thin film composite (TFC) membranes can be used in reverse osmosis (RO) and forward osmosis (FO) applications. The membranes include a support layer, which is preferably porous. The support layer can be hydrophilic or hydrophobic. In some applications, the support layer is hydrophilic. The TFC membrane also includes at least one discrimination layer on a surface of the support layer. The TFC membrane can include an anti-fouling layer deposited on either or both surfaces of the TFC membrane. The TFC membrane also can include a protective layer deposited on either or both surfaces of the TFC membrane or on an anti-fouling layer. For example, to prevent scratching of the membrane surface or to alter adsorption, a hydrophilic polymer layer can be applied to the surface of the discrimination layer or the anti-fouling layer. For example, a solution of polyvinyl alcohol in water can be applied to the surface of the discrimination layer followed by application of heat to provide a heat cure of the hydrophilic polymer layer.

1. Support Layer

The support layer typically includes a polymeric microporous support membrane, which in turn is often supported by a non-woven or woven mesh fabric to improve handling properties of the membranes or for mechanical strength or both. The support layer can include a polysulfone or other suitably porous membrane, such as a membrane containing polyethersulfone, poly(ether sulfone ketone), poly(ether ethyl ketone), poly(phthalazinone ether sulfone ketone), polyethylene glycol, polyacrylonitrile, polyvinyl chloride, polyester, polystyrene, polysulfone, polypropylene, cellulose nitrate, cellulose acetate, cellulose diacetate, or cellulose triacetate. The support layer typically is about 25 to 250 microns in thickness. The support layer is porous, and often the smallest pores of the support layer are located very near the upper surface. Porosity at the surface can be low, for instance from 5-15%, of the total surface area.

The preparation of the support layer can include spraying or casting a polymer solution onto a woven or non-woven fabric layer. Exemplary processes known in the art to form the support layer are disclosed, for example, in U.S. Pat. Nos. 3,926,798; 4,039, 440; 4,337,154; and 8,177,978; and in U.S. Patent Application Publication Nos. 2011/0174728 and 2014/0014575, the disclosure of each of which is incorporated herein by reference. One or more than one reinforcing fabric layer of a woven or nonwoven material or a combination thereof, made up of polymeric fibers, can be included in the TFC membrane. When present, the fabric layer preferably is permeable to water, is flat, and is without stray fibers that could penetrate the support layer or the discrimination layer. The fabric layer generally is thin to decrease cost and to maximize membrane area, is resistant to extensional forces, and is mechanically resistant to deformation at high pressures.

The preparation of the support layer generally includes the addition of N-methylpyrrolidone (NMP) solvent (Acros Organics, Waltham, Mass., USA) to a polysulfone polymer ($M_n$-26,000 ($M_n$ being the number average molecular weight) from Aldrich, St. Louis, Mo.) in transparent bead form in airtight glass bottles. Alternatively, dimethylformamide (DMF) can be used as the solvent. The mixture then is agitated for several hours until complete dissolution of the polysulfone polymer is achieved, forming a dope or casting solution. The casting solution can be cast or spread over a woven or non-woven mesh fabric layer, which optionally can be attached to glass plate via a knife-edge. In some embodiments, the glass plate with the mesh fabric layer and casting solution can be immediately immersed into demineralized water, which has been maintained at the desired temperature (such as from about 4° C. to about 30° C.). Immediately, phase inversion begins and after several minutes, the woven or non-woven fabric layer supporting the polysulfone membrane can be separated from the glass plate to form the support layer. The support layer then can be washed thoroughly with deionized water and stored in cold conditions until used. In a continuous coating process for production of a support layer (e.g., using equipment and/or a process similar to those described in U.S. Pat. Nos. 4,214,994; 4,277,344; 6,153,133; 7,490,725; and 8,580,341; U.S. Pat. App. Pub. Nos. 2009/0050558A1 and 2012/0292249A1; and International Patent Application Publication WO 2014/080426 A1, which describe coating processes for continuous preparation of reverse osmosis membranes), a glass plate would not be required. The porous support layer typically is kept wet until use.

The casting solution of the support layer can include additives. For example, the casting solution can include nanoparticles, such as zeolites or carbon nanotubes or spherical fullerenes or a combination thereof, an alkylene glycol, a polyalkylene glycol, N-methyl-2-pyrrolidinone, dimethylacetamide, or any combination of these additives. Exemplary alkylene glycols include ethylene glycol, diethylene glycol, triethylene glycol, propylene glycol, dipropylene glycol, and tripropylene glycol and combinations thereof. Exemplary polyalkylene glycols include a polyethylene glycol (PEG) and a polypropylene glycol. Polyethylene glycols (PEGs) having molecular weights of 400 to 20,000, preferably 600 to 2,000, can be included in the casting solution.

2. Discrimination Layer

At least one discrimination layer comprising a polyamide and the combination of flux enhancing additives described herein is formed on a surface of the support layer, thereby forming a thin film composite membrane. The discrimination layer is synthesized using an interfacial polymerization process on the porous support membrane. In the synthesis of the discrimination layer, two immiscible solvents are used, usually an aqueous phase and an organic phase solution, so that a monomer in one solvent reacts with a monomer in the other solvent to polymerize and form the discrimination layer. The polymerization reactions are very fast and relatively high molecular weight polymers are obtained.

The discrimination layer is a permeable membrane that can contain any material as long as the discrimination layer allows filtration of a fluid for which filtration is desired. In an exemplary embodiment, the discrimination layer can be a polyamide layer. Although the chemistry of the discrimination layer is not to be viewed as limited, in an exemplary embodiment the polyamide layer can be formed by interfacial polymerization of a polar solution and a non-polar solution. An exemplary polar solution can be an aqueous phase containing a polyamine such as m-phenylenediamine (MPD). An exemplary non-polar solution can be an organic phase containing a polyfunctional acid halide such as trimesoyl chloride (TMC).

Discrimination layers prepared by methods and chemistries known in the art, for example, the chemistry and methods of manufacturing discrimination layers that are disclosed in any of U.S. Pat. Nos. 4,277,344; 4,902,424; 5,108,607; 5,543,046; 6,337,018; and 7,109,140, all of which are herein incorporated by reference, often do not exhibit adequate salt rejection and flux after formation on a surface of a support layer to produce a thin film composite membrane. As shown herein, the methods and chemistries known in the art can be modified to include the combination of flux enhancing additives described herein during formation of the discrimination layer, such as by adding the combination of flux enhancing additives described herein to the aqueous phase or organic phase or both, producing thin film composite membranes that exhibit good flux and salt rejection, thereby overcoming the deficiencies of known membranes.

In some embodiments, the discrimination layer generally contains a polyamide formed by the interfacial polymerization between one or more di- or polyfunctional amines and one or more di- or polyfunctional acyl chlorides. The di- or polyfunctional amines can be aromatic and/or aliphatic. The di- or polyfunctional acyl chlorides can be aromatic and/or aliphatic.

Generally, the polymer matrix that forms the discrimination layer can be prepared by reaction of two or more monomers. The first monomer can be a dinucleophilic or a polynucleophilic monomer and the second monomer can be a dielectrophilic or a polyelectrophilic monomer. That is, each monomer can have two or more reactive (e.g., nucleophilic or electrophilic) groups. Both nucleophiles and electrophiles are well known in the art, and one of skill in the art can select suitable monomers for this use. The first and second monomers can also be chosen so as to be capable of undergoing an interfacial polymerization reaction to form a polymer matrix (i.e., a three-dimensional polymer network) when brought into contact. The first and second monomers also can be selected so as to be capable of undergoing a polymerization reaction when brought into contact to form a polymer product that is capable of subsequent crosslinking by, for example, exposure to heat, light radiation, or a chemical crosslinking agent.

The first monomer can be selected so as to be soluble in a polar liquid, preferably water, to form a polar mixture. For example, the first monomer can be a difunctional or polyfunctional nucleophilic monomer. The difunctional or polyfunctional nucleophilic monomer can have primary or secondary amino groups and can be aromatic (e.g., a diaminobenzene, a triaminobenzene, m-phenylenediamine (MPD), p-phenylenediamine, 1,3,5-triaminobenzene, 1,3,4-triaminobenzene, 3,5-diaminobenzoic acid, 2,4-diaminotoluene, 2,4-diaminoanisole, and xylylenediamine) or aliphatic (e.g., ethylenediamine, propylenediamine, piperazine, and tris(2-diamino-ethyl)amine). In some examples, the polar liquid and the first monomer can be the same compound; that is, the first monomer can be provided and not dissolved in a separate polar liquid.

Examples of suitable amine species include primary aromatic amines having two or three amino groups, e.g., m-phenylenediamine, and secondary aliphatic amines having two amino groups, e.g., piperazine. In some embodiments, two or more different species of amine monomer can be included in the polar liquid (e.g., water) to form the polar phase. The amine can be applied to the microporous support as a solution in a polar liquid, e.g., water. The resulting polar mixture typically includes from about 0.1 wt % to about 20 wt %, preferably from about 0.5 wt % to about 6 wt %, amine. Once coated on a porous support layer, excess polar mixture optionally can be removed. The polar mixture need not be aqueous, but the polar liquid should be immiscible with the non-polar liquid. Although water is a preferred solvent, non-aqueous polar solvents can be used, such as acetonitrile, lower monohydric alcohols and ketones. Combinations of water and one or more polar solvents can be used.

In some embodiments, a second monomer can be selected so as to be miscible with the polar liquid forming a polar mixture (i.e., aqueous phase). The second monomer optionally also can be selected so as to be immiscible with a non-polar liquid. The second monomer can be a dinucleophilic or a polynucleophilic monomer. The nucleophilic monomer can contain two or more, for example, three, nucleophilic groups per molecule.

The polar mixture can be applied to the porous support layer by dipping, immersing, coating, spraying, or any other application technique. Once coated on the porous support layer, excess polar mixture optionally can be removed by evaporation, drainage, air knife, rubber wiper blade, nip roller, sponge, or other device or process.

In some embodiments of the processes provided herein, an aqueous phase containing a combination of flux enhancing additives that includes a phosphoramide and a metal chelate additive that contains a bidentate ligand and a metal atom or metal ion is applied on a surface of a support layer, and an organic phase layer then is applied, the components of which interact with components of the aqueous phase, and at the interface between these layers polymerization occurs, resulting in formation of a discrimination layer.

The method of forming the discrimination layer on a surface of the porous support layer can include floating the porous support layer on the surface of the aqueous phase, casting the aqueous phase on a surface of the porous support layer, spraying the aqueous phase onto a surface of the porous support layer, or immersing the porous support layer in the aqueous phase. In methods that include floating or immersing the porous support in the aqueous phase, the treating time can be varied very widely in a range of from about 1 second to about 24 hours or longer, but such treating time is not critical. Effecting the treatment once usually is sufficient, but the treatment can be performed twice or more.

Representative conditions for reaction of an amine (e.g., MPD) with an electrophile (e.g., TMC) to form a polyamide thin film composite membrane include use of a ratio of concentration of MPD to concentration of TMC in the range of from about 10:1 to about 40:1, with the MPD concentration being from about 1 wt % to about 6 wt % of the polar phase (aqueous phase). In some embodiments, the ratio of concentration of MPD to concentration of TMC is about 10:1, or about 11:1, or about 12:1, or about 13:1, or about 14:1, or about 15:1, or about 16:1, or about 17:1, or about 18:1, or about 19:1, or about 20:1, about 21:1, or about 22:1, or about 23:1, or about 24:1, or about 25:1, or about 26:1, or about 27:1, or about 28:1, or about 29:1, or about 30:1, or about 31:1, or about 32:1, or about 33:1, or about 34:1, or about 35:1, or about 36:1, or about 37:1, or about 38:1, or about 39:1, or about 40:1. The polymerization reaction can be carried out at room temperature in an open environment, or the temperature of either the polar or the apolar liquid, or both, can be modulated or controlled, e.g., at a temperature above room temperature (20° C. to 25° C.) or a temperature below room temperature. Once formed, the discrimination layer can act as a barrier to inhibit contact between the reactants and to slow the reaction. The discrimination layer typically is very thin and permeable to water, but relatively impermeable to dissolved, dispersed, or suspended solids, such as salts to be removed from saltwater or brackish water in use to produce purified water.

In some embodiments, the amount of the combination of flux enhancing additives used in the aqueous phase or organic phase is selected to yield a ratio of the concentration of MPD to the concentration of phosphoramide in the range of from about 1:1 to about 10:1, with the MPD concentration being from about 1 wt % to about 6 wt % of the aqueous phase or organic phase. In some embodiments, the range of the ratio of concentration of MPD to the concentration of phosphoramide is from about 1.5:1 to about 5:1, or from about 1.7:1 to about 3.3:1, or from about 2:1 to about 5:1, or from about 2:1 to about 2.5:1.

In some embodiments, the metal chelates can release the metal ion or metal atom, e.g., a Group 2 (alkaline earth, such as Be, Mg, Ca, Sr, and Ba) or Group 13 (aluminum, gallium, indium or thallium) metal ion or metal atom. The metal chelates can be dispersed with the phosphoramide within the aqueous phase or organic phase. Nanoparticles or carriers or processing aids, such as catalysts, co-reactants, and co-solvents, or any combination thereof, also can be present in the aqueous phase or organic phase to modify surface properties or further increase performance, for example, to improve fouling resistance. In some embodiments, the processes provided herein include in the aqueous phase MPD, TEACSA, SLS or other surfactant, and the flux enhancing combination of additives that includes a phosphoramide and $Sr(acac)_2$ or $Sr(F_6acac)_2$ or a combination thereof.

In an exemplary embodiment, the aqueous phase is formed by adding one or more additives to the polar solvent, e.g., water, in the following order: polyamine, e.g., MPD; surfactant, e.g., SLS; phosphoramide, e.g., HMPA; a metal chelate additive containing a bidentate ligand and a metal atom or metal ion; and a drying agent, e.g., TEACSA. In another example, the aqueous phase is formed by adding, in the following order: a drying agent, e.g., TEACSA; a polyamine, e.g., MPD; a surfactant, e.g., SLS; a phosphoramide, e.g., HMPA; and a metal chelate additive containing a bidentate ligand and a metal atom or metal ion, to a polar solvent, e.g., water. In yet another example, the aqueous phase is formed by adding one or more additives to a polar solvent, e.g., water. In yet another example, the polar solvent, e.g., water, is added to a drying agent, e.g., TEACSA, followed by addition of the other additives. Typically, the polar solvent, e.g., water, is present in the aqueous phase first and all other additives are added to the solvent, although any permutation of order of addition of the components can be used.

In some embodiments, a second monomer can be selected so as to be miscible with the non-polar liquid forming a non-polar mixture (i.e., organic phase), although for monomers having sufficient vapor pressure, the monomer optionally can be delivered from a vapor phase. The second monomer optionally also can be selected so as to be immiscible with a polar liquid. The second monomer can be a dielectrophilic or a polyelectrophilic monomer. The electrophilic monomer can be aromatic in nature and can contain two or more, for example, three, electrophilic groups per molecule. The second monomer can be a trimesoyl halide. For the case of acyl halide electrophilic monomers, acyl chlorides are generally more suitable than the corresponding bromides or iodides because of the relatively lower cost and greater availability.

Suitable acyl halides include polyfunctional acid halides, including trimesoyl chloride (TMC), trimellitic acid chloride, isophthaloyl chloride, terephthaloyl chloride and similar compounds or blends of suitable acyl halides. As a further example, the second monomer can be a phthaloyl halide.

The polyfunctional acyl halide can be dissolved in the non-polar liquid (i.e., organic solvent) in a range of, for example, from about 0.01 wt % to about 10.0 wt %, or from about 0.03 wt % to about 3 wt %, or from about 0.05 wt % to about 5 wt %. Suitable non-polar liquids are capable of dissolving the electrophilic monomer (e.g., polyfunctional acyl halide) and are immiscible with a polar liquid (e.g., water). Generally the non-polar liquid (i.e., organic solvent) is a water-immiscible solvent that is inactive in the interfacial polymerization reaction, does not form a chemical bond with the electrophilic monomer (e.g., polyfunctional acid halide), and does not damage the porous support layer. Exemplary non-polar liquids (i.e., organic solvents) that can be used to dissolve the electrophilic monomer (e.g., acyl halide) include aliphatic hydrocarbons, such as $C_8$-$C_{24}$ hydrocarbons and mixtures thereof, such as isoparaffinic solvents such as Isopar™ isoparafinnic fluids (e.g., Isopar™ G petroleum naphtha, a low odor, low aromatic $C_{10}$-$C_{12}$ isoalkanes solvent, sold by ExxonMobil, Irving, Tex.) and Isane® isoparaffinic solvents (Total Special Fluids, Oudalle, France). The non-polar liquid (i.e., organic solvent) can be a single solvent or a mixture of solvents.

Additional non-polar liquids (i.e., organic solvents) can be included in the organic phase. For example, a non-polar liquid that does not pose a threat to the ozone layer and yet is sufficiently safe in terms of its flashpoint and flammability to undergo routine processing without having to undertake extreme precautions can be selected. These solvents can include $C_5$-$C_7$ hydrocarbons and higher boiling point hydrocarbons and aromatics, i.e., those with boiling points greater than about 90° C., such as $C_8$-$C_{24}$ hydrocarbons and mixtures thereof, which have more suitable flashpoints than their $C_5$-$C_7$ counterparts, but are less volatile. Exemplary non-polar liquids that can be included in the organic phase include trimethylbenzenes, such as 1,2,3-trimethylbenzene, 1,2,4-trimethylbenzene, and 1,3,5-trimethylbenzene (mesitylene); tetramethylbenzenes, such as 1,2,3,4-tetramethylbenzene, 1,2,4,5-tetramethylbenzene and 1,3,4,5-tetramethylbenzene; pentamethylbenzene, hexamethylbenzene, diisopropylbenzenes, triisopropylbenzenes, and tetraisopropylbenzenes. In some embodiments, the organic phase includes a polyfunctional acyl halide and 1,3,5-trimethylbenzene.

The organic phase can include antioxidants. For example, antioxidants for processing and long-term thermal stabilization can be included in the organic phase. Antioxidants can protect the membrane against degradation, for example, from light exposure. Exemplary antioxidants include phenolic primary antioxidants, such as the phenolic primary antioxidant pentaerythritol tetrakis(3-(3,5-di-tert-butyl-4-hydroxyphenyl)propionate), sold as Irganox® 1010. The antioxidant can be dissolved in the organic phase in a range of, for example, from about 0.0025 wt % to 0.05 wt %, or from about 0.005 wt % to 0.025 wt %, or from about 0.01 wt % to about 0.025 wt %.

The polyfunctional acyl halide can be dissolved in the non-polar liquid (i.e., organic solvent) in a range of, for example, from about 0.01 wt % to about 10.0 wt %, or from about 0.03 wt % to about 3 wt % or from about 0.05 wt % to about 5 wt %.

In an exemplary embodiment, the non-polar solution is formed by mixing one or more components, when present, in the following order: antioxidant, e.g., tetrakis(3-(3,5-di-tert-butyl-4-hydroxyphenyl)propionate); polyfunctional acid halide, e.g., TMC; and a mixture of a non-polar liquid, e.g., 1,3,5-trimethylbenzene, added to an isoparaffinic solvent, e.g., Isopar™ G.

The non-polar mixture (i.e., organic phase) can be applied by dipping, immersing, coating, spraying, or any other application technique.

In some embodiments, the polyfunctional acyl halide monomer (also referred to as acid halide) is coated on the porous support layer, typically by application of the organic phase solution. The amine solution is typically coated first on the porous support followed by the acyl halide solution. The monomers can react when in contact, thereby polymerizing to produce a polymer (e.g., polyamide) matrix discrimination layer at the upper surface of the support layer. Although one or both of the polyfunctional amine and acyl halide layers can be applied to the porous support layer from a solution, such as by application of the aqueous and organic phases discussed above, they alternatively can be applied by other means, such as by vapor deposition or heat.

In the processes provided herein, the combination of flux enhancing additives that includes a phosphoramide and a metal chelate additive containing a bidentate ligand and a metal atom or metal ion is added to the aqueous phase or organic phase or both of the interfacial polymerization process before contact between the phases. By including the combination of flux enhancing additives in the aqueous phase or organic phase or both, increased flux through the membrane is observed, e.g., during reverse osmosis, without substantially affecting salt rejection. In some examples, the salt rejection is maintained. In other examples, the salt rejection is improved.

The combination of flux enhancing additives that includes a phosphoramide and a metal chelate additive containing a bidentate ligand and a metal atom or metal ion is thought to affect the polymerization reaction and ultimately membrane structure, leading to improved performance. Nanoparticles, such as zeolites or carbon nanotubes or spherical fullerenes or a combination thereof, also can be present, in either the aqueous phase or the organic phase or both, to modify surface properties or further increase performance, e.g., to improve fouling resistance.

It can be advantageous to store the support layer for a period of time, e.g., from 1 minute for up to one hour, before interfacial polymerization on the support layer between aqueous and organic phase solutions. In some embodiments, the discrimination layer can be formed by applying the organic phase solution to the support layer and, after at least 10 seconds, preferably 2 minutes, and more preferably 5 minutes, after the organic phase solution was applied, applying the aqueous phase to the organic phase solution on the support layer. In some embodiments, the discrimination layer can be formed by applying the aqueous phase to the support layer, allowing it to dry, and then applying the organic phase solution to the dried aqueous phase on the support layer.

Prior to addition to the aqueous phase, the combination of flux enhancing additives that includes a phosphoramide and a metal chelate additive containing a bidentate ligand and a metal atom or metal ion can be subjected to sonic or ultrasonic energy, e.g., from an ultrasonic probe or ultrasonic bath, and/or the aqueous phase can be subjected to sonic or ultrasonic energy just before or during interfacial polymerization. In some applications, an ultrasonic probe can be immersed into the aqueous phase containing the combination of flux enhancing additives that include a phosphoramide and a metal chelate additive containing a bidentate ligand and a metal atom or metal ion prior to or during interfacial polymerization or both. In some applications, the aqueous phase containing the metal chelate is subjected to ultrasonic energy for a time from about 1 minute to about 60 minutes prior to interfacial polymerization.

The amount of metal chelate additive containing a bidentate ligand and a metal atom or metal ion in the combination of additives can be selected to yield a concentration in the aqueous phase or organic phase of from about 0.001 wt % to about 1 wt %, based on the weight of the aqueous phase or organic phase. In some embodiments, the amount of metal chelate additive containing a bidentate ligand and a metal atom or metal ion in the combination of additives can be selected to yield a concentration in the aqueous phase or organic phase of from about 0.005 wt % to about 0.75 wt %, or from about 0.06 wt % to about 0.6 wt %, or from about 0.055 wt % to about 0.55 wt %, based on the weight of the aqueous phase or organic phase. In some embodiments, the amount of metal chelate additive containing a bidentate ligand and a metal atom or metal ion in the combination of additives can be selected to yield a concentration in the aqueous phase or organic phase of at least 0.025 wt %, or at least 0.05 wt %, or at least 0.075 wt %, or at least 0.1 wt %.

The amount of phosphoramide in the combination of additives can be selected to yield a concentration in the aqueous phase or organic phase of from about 0.1 wt % to about 4 wt %, based on the weight of the aqueous phase or organic phase. In some embodiments, the amount of phosphoramide in the combination of additives can be selected to yield a concentration in the aqueous phase or organic phase of from about 0.25 wt % to about 2 wt %, or from about 0.5 wt % to about 1.5 wt %, based on the weight of the aqueous phase or organic phase.

Practice of the invention does not depend critically on the overall shape of the thin film composite membrane. Flat sheet and hollow fiber configurations are two of the possibilities for this overall shape. For flat sheet membranes, a discrimination layer can be on the top surface, the bottom surface, or on both surfaces of the support layer. For hollow fiber membranes, a discrimination layer can be on the inner surface of the support layer, the outer surface of the support layer, or on both inner and outer surfaces of the support layer.

3. Protective Layer

The thin film composite semipermeable membrane produced by the methods provided herein can be provided with a protective coating layer by coating the surface of the membrane with an aqueous phase of a water-soluble organic polymer in order to protect the membrane surface from damage during the handling of the membrane. Examples of such a water-soluble organic polymer include polymers such as polyethylenimine, polyvinyl alcohol, polyvinyl ether, polyvinylpyrrolidone, polyacrylamide, or polyacrylic acid; copolymers consisting mainly of the monomers constituting these polymers; derivatives of these polymers or copolymers; and mixtures of these compounds. Among them, polyvinyl alcohol, polyethylenimine and polyvinylpyrrolidone are particularly preferred.

The TFC membrane coated with such an aqueous phase of a water-soluble organic polymer generally is subjected to drying. The drying is effected by exposing the coated membrane to temperatures of from about 30° C. to about 100° C. for a time of about 1 minute to about 20 minutes. The time required for drying depends on the type of oven used and membrane placement within the oven.

4. Anti-Fouling Layer

Anti-fouling layers can be deposited on either or both surfaces of the thin film composite membrane. An RO membrane can be provided with an anti-fouling capacity by applying a layer capable of forming halamines on the feed stream contact surface of the RO membrane (see, e.g., U.S. Pat. No. 8,567,612). For example, an anti-fouling layer can be formed by depositing a nitrogen-containing polymer solution on the discrimination layer. The polymer can be cross-linked to insolubilize the anti-fouling layer. An intermediate layer can be positioned between the anti-fouling and the discrimination layers so that the thickness and permeability of the anti-fouling and intermediate layers are sufficient to cause halamine formation at the surface of the anti-fouling layer before the discrimination layer is degraded by the halogen. Sufficient nitrogen can be provided in the anti-fouling layer to protect the discrimination layer from fouling by the formation of halamines on the surface of the anti-fouling layer adjacent the feed stream, to permit recharging of the anti-fouling layer by the further addition of halogens thereto to form additional halamines and/or to prevent halogen damage to the discrimination layer by the halogen during operation after multiple recharging.

Other chemistries and techniques for providing an anti-fouling layer, such as treatment with polyethylene oxide to introduce PEG moieties, or using fluorinated polymers or polyacrylonitrile graft copolymers, are known in the art (e.g., see U.S. Pat. Nos. 8,163,814; 8,505,743; 8,505,745; and 8,754,139, the disclosure of each of which is incorporated by reference herein).

E. Modules

The membranes produced using the processes described herein can be spirally wound around a central porous permeate collection tube to produce a semipermeable membrane module for use in a pressure vessel. A typical spirally wound semipermeable membrane module includes a plurality of leaves that are individual envelopes of sheet-like semipermeable membrane material that sandwich therebetween a layer of porous permeate carrying material, such as polyester fibrous sheet material. The semipermeable membrane material includes the membranes produced using the processes described herein.

Interleaved between adjacent leaves generally are lengths of spacer material, which may be woven or non-woven or other open mesh, screen-like crosswise designs of synthetic filaments, e.g. cross-extruded filaments of polypropylene, that provide flow passageways for the feed water being pumped from end to end through the pressure vessel. An appropriate lay-up of such alternating leaves and spacer sheets is then spirally wound about a hollow tube having a porous sidewall to create a right circular cylindrical module. An exemplary spirally wound separation module is shown in FIG. 1 and in U.S. Pat. No. 4,842,736, the disclosure of which is incorporated herein by reference. The module contains a plurality of spiral feed passageways, through which passageways the feed liquid being treated flows in an axial direction. Internally within the membrane envelopes, the permeating liquid flows along a spiral path inward until it reaches the perforated central tube where it collects and through which it then flows axially to the outlet.

FIG. 1 illustrates an exemplary embodiment of a spiral-wound module. The module includes perforated central tube 1 that collects the filtered fluid. The material of perforated central tube 1 is not limited and can be any material that is resistant to corrosion to the fluid being filtered. In exemplary embodiments, perforated central tube 1 can be made of polyvinyl chloride (PVC). Other materials that also can be used include metals, polymers, ceramics, or combinations thereof. Additional exemplary materials that can be used to form the perforated central tube 1 include plastic materials such as acrylonitrile-butadiene-styrene, polysulfone, poly (phenylene oxide), polystyrene, polypropylene, polyethylene, or the like. The size and arrangement of the perforations can be arranged in any manner, as long as they allow for the filtered fluid to flow into the perforated central tube 1. Wound around perforated central tube 1 is a set of leaves composed of folded permeable membrane sheets 2, feed channel spacers 3, and permeate collection sheet 4. Around the outside of the module is shell 5 and an anti-telescoping device 6, located at each end of the module.

Modules containing membranes produced using the processes described herein can be used to produce a stream of potable water from brackish water at relatively low pressure conditions, i.e., not greater than about 225 psi, and in some embodiments at pressures of about 150 psi or less. These low pressure conditions can permit the use of pressure vessels, pumps, valves, and piping having a more moderate pressure rating than usually require for reverse osmosis systems and to thereby avoid the cost of expensive high pressure RO systems. This substantially reduces not only initial capital costs but operating costs as well, compared to standard high pressure seawater desalination systems. Capital costs can be significantly reduced because operating pressures are about one-half to about two-thirds of those used in conventional seawater desalinization systems and pressure vessels rated for a pressure of about 225 psi or below can be used, avoiding the costs associated with design and fabrication of high pressure vessels. In addition, because the operating pressure is lower than that required for conventional seawater RO desalinization installations, the power costs are lower. The membranes and processes described herein can also be used to purify tap water and seawater.

F. Membrane Characteristics

In preferred embodiments, the salt rejection is at least 99.5% and the flux of brackish water (2,000 ppm NaCl) is at least 20, 21, 22, 23, 24, 25, 26, 27, 28, 29, 30, 31 gallons/ft$^2$/day (gfd) at 150 psi.

Water flux can be determined by measuring permeate flow using Equation 1:

$$\text{Flux } (gfd) = \frac{\text{permeate (gallons)}}{\text{membrane area (ft}^2) \cdot \text{time (day)}}.$$

Salt rejection (R, in %) can be calculated using Equation 2:

$$R\ (\%) = \left(1 - \frac{Cp}{Cf}\right) \times 100$$

where $C_f$ is the concentration of salt in the feed water and $C_p$ is the concentration of salt in the permeate, both of which can be measured using a calibrated conductivity meter.

G. Examples

1. Preparation and Comparison of Thin Film Composite Membranes Containing a Metal Chelate Additive and/or a Phosphoramide Thin film composite membranes were prepared by interfacial polymerization and were tested to determine the effect that the presence of a combination of a phosphoramide and a metal chelate additive in the membrane has on the membrane's flux and salt rejection as compared to membranes that contained only a phosphoramide additive or neither a phosphoramide additive nor a metal chelate additive.

The membranes were prepared using the following general procedure. A polysulfone support was coated with an aqueous solution that contained a polyamine, then was coated with an organic solution that contained a polyfunctional acid halide. After coating with the organic solution, the membranes were dried in a convection oven at 95° C. for 8 minutes before testing.

Components of the aqueous solution included: a polyamine, m-phenylenediamine (MPD; DuPont, Wilmington, Del.); a drying agent, triethylamine camphorsulfonic acid (TEACSA; Sunland Chemical and Research, Los Angeles, Calif.); a surfactant, sodium lauryl sulfate (SLS; Columbus Chemical Industries, Columbus, Wis.); a metal chelate additive, $Sr(F_6acac)_2$; a phosphoramide, hexamethylphosphoramide (HMPA; Sigma Aldrich, St. Louis, Mo.); and a polar solvent, water.

Components of the organic solution included: an antioxidant, Irganox® 1010 (a sterically hindered phenolic antioxidant, CAS No. 6683-19-8 from BASF Schweiz AG, Basel, Switzerland); a polyfunctional acid halide, trimesoyl chloride (TMC; Sigma Aldrich, St. Louis, Mo.); non-polar liquids that include 1,3,5-trimethylbenzene (TMB, mesitylene; Sigma Aldrich, St. Louis, Mo.) and an isoparafinnic solvent, Isopar™ G solvent (a low odor, low aromatic hydrocarbon solvent from ExxonMobile Chemical Company, Houston, Tex.).

Tables 1-9 below list the components and amounts of each in TFC membranes 1-9.

TABLE 1

TFC membrane 1 without HMPA or metal chelate additive

| Ingredient | Phase | wt % of composition |
|---|---|---|
| MPD (polyamine) | Aqueous | 3.5 |
| TEACSA (drying agent) | Aqueous | 6.75 |
| SLS (surfactant) | Aqueous | 0.06 |
| $Sr(F_6acac)_2$ (metal chelate additive) | Aqueous | — |
| HMPA (phosphoramide) | Aqueous | — |
| Water (polar solvent) | Aqueous | 89.69 |
| Irganox ® 1010 (antioxidant) | Organic | 0.0145 |
| TMC (polyfunctional acid halide) | Organic | 0.287 |
| 4% TMB in Isopar ™ G (non-polar solvents) | Organic | 99.70 |

TABLE 2

| TFC membrane 2 containing 0.5% HMPA and no metal chelate additive | | |
|---|---|---|
| Ingredient | Phase | wt % of composition |
| MPD (polyamine) | Aqueous | 3.5 |
| TEACSA (drying agent) | Aqueous | 6.75 |
| SLS (surfactant) | Aqueous | 0.06 |
| $Sr(F_6acac)_2$ (metal chelate additive) | Aqueous | — |
| HMPA (phosphoramide) | Aqueous | 0.5 |
| Water (polar solvent) | Aqueous | 89.19 |
| Irganox ® 1010 (antioxidant) | Organic | 0.0145 |
| TMC (polyfunctional acid halide) | Organic | 0.287 |
| 4% TMB in Isopar ™ G (non-polar solvents) | Organic | 99.70 |

TABLE 3

| TFC membrane 3 containing 1% HMPA and no metal chelate additive | | |
|---|---|---|
| Ingredient | Phase | wt % of composition |
| MPD (polyamine) | Aqueous | 3.5 |
| TEACSA (drying agent) | Aqueous | 6.75 |
| SLS (surfactant) | Aqueous | 0.06 |
| $Sr(F_6acac)_2$ (metal chelate additive) | Aqueous | — |
| HMPA (phosphoramide) | Aqueous | 1.0 |
| Water (polar solvent) | Aqueous | 88.69 |
| Irganox ® 1010 (antioxidant) | Organic | 0.0145 |
| TMC (polyfunctional acid halide) | Organic | 0.287 |
| 4% TMB in Isopar ™ G (non-polar solvents) | Organic | 99.70 |

TABLE 4

| TFC membrane 4 containing 1.5% HMPA and no metal chelate additive | | |
|---|---|---|
| Ingredient | Phase | wt % of composition |
| MPD (polyamine) | Aqueous | 3.5 |
| TEACSA (drying agent) | Aqueous | 6.75 |
| SLS (surfactant) | Aqueous | 0.06 |
| $Sr(F_6acac)_2$ (metal chelate additive) | Aqueous | — |
| HMPA (phosphoramide) | Aqueous | 1.5 |
| Water (polar solvent) | Aqueous | 88.19 |
| Irganox ® 1010 (antioxidant) | Organic | 0.0145 |
| TMC (polyfunctional acid halide) | Organic | 0.287 |
| 4% TMB in Isopar ™ G (non-polar solvents) | Organic | 99.70 |

TABLE 5

| TFC membrane 5 containing 0.5% HMPA and 0.05% metal chelate additive | | |
|---|---|---|
| Ingredient | Phase | wt % of composition |
| MPD (polyamine) | Aqueous | 3.5 |
| TEACSA (drying agent) | Aqueous | 6.75 |
| SLS (surfactant) | Aqueous | 0.06 |
| $Sr(F_6acac)_2$ (metal chelate additive) | Aqueous | 0.05 |
| HMPA (phosphoramide) | Aqueous | 0.5 |
| Water (polar solvent) | Aqueous | 89.14 |
| TMC (polyfunctional acid halide) | Organic | 0.287 |
| 4% TMB in Isopar ™ G (non-polar solvents) | Organic | 99.71 |

TABLE 6

| TFC membrane 6 containing 0.75% HMPA and 0.05% metal chelate additive | | |
|---|---|---|
| Ingredient | Phase | wt % of composition |
| MPD (polyamine) | Aqueous | 3.5 |
| TEACSA (drying agent) | Aqueous | 6.75 |
| SLS (surfactant) | Aqueous | 0.06 |
| $Sr(F_6acac)_2$ (metal chelate additive) | Aqueous | 0.05 |
| HMPA (phosphoramide) | Aqueous | 0.75 |
| Water (polar solvent) | Aqueous | 88.89 |
| TMC (polyfunctional acid halide) | Organic | 0.287 |
| 4% TMB in Isopar ™ G (non-polar solvents) | Organic | 99.71 |

TABLE 7

| TFC membrane 7 containing 1% HMPA and 0.05% metal chelate additive | | |
|---|---|---|
| Ingredient | Phase | wt % of composition |
| MPD (polyamine) | Aqueous | 3.5 |
| TEACSA (drying agent) | Aqueous | 6.75 |
| SLS (surfactant) | Aqueous | 0.06 |
| $Sr(F_6acac)_2$ (metal chelate additive) | Aqueous | 0.05 |
| HMPA (phosphoramide) | Aqueous | 1.0 |
| Water (polar solvent) | Aqueous | 88.64 |
| TMC (polyfunctional acid halide) | Organic | 0.287 |
| 4% TMB in Isopar ™ G (non-polar solvents) | Organic | 99.71 |

TABLE 8

| TFC membrane 8 containing 1.25% HMPA and 0.05% metal chelate additive | | |
|---|---|---|
| Ingredient | Phase | wt % of composition |
| MPD (polyamine) | Aqueous | 3.5 |
| TEACSA (drying agent) | Aqueous | 6.75 |
| SLS (surfactant) | Aqueous | 0.06 |
| $Sr(F_6acac)_2$ (metal chelate additive) | Aqueous | 0.05 |
| HMPA (phosphoramide) | Aqueous | 1.25 |
| Water (polar solvent) | Aqueous | 88.39 |
| TMC (polyfunctional acid halide) | Organic | 0.287 |
| 4% TMB in Isopar ™ G (non-polar solvents) | Organic | 99.71 |

TABLE 9

| TFC membrane 9 containing 1.5% HMPA and 0.05% metal chelate additive | | |
|---|---|---|
| Ingredient | Phase | wt % of composition |
| MPD (polyamine) | Aqueous | 3.5 |
| TEACSA (drying agent) | Aqueous | 6.75 |
| SLS (surfactant) | Aqueous | 0.06 |
| $Sr(F_6acac)_2$ (metal chelate additive) | Aqueous | 0.05 |
| HMPA (phosphoramide) | Aqueous | 1.5 |
| Water (polar solvent) | Aqueous | 88.14 |
| TMC (polyfunctional acid halide) | Organic | 0.287 |
| 4% TMB in Isopar ™ G (non-polar solvents) | Organic | 99.71 |

The flux and salt rejection of TFC membranes 1-9, listed in Tables 1-9, above, were tested under standard brackish water conditions (225 psi, 2,000 ppm NaCl) after 1 hour and again after running overnight (8 hours or 11 hours). Volume and time measurements were taken in a graduated cylinder and flux was determined using the following equation:

$$\text{Flux } (gfd) = \frac{\text{permeate (gallons)}}{\text{membrane area } (\text{ft}^2) \cdot \text{time (day)}}.$$

Salt rejection was measured from the same volume of permeate collected for flux measurements and was measured with a conductivity meter.

Table 10, below, shows the results of the flux measurement tests and Table 11, below, shows the results of the salt rejection tests, with standard deviation values listed in parentheses. As shown in Table 10, flux increased slightly for the membranes that did not contain any metal chelate additive but contained at least 0.5% HMPA (TFC membranes 2-4) as compared to the membrane that did not contain either HMPA or a metal chelate additive (TFC membrane 1). Membranes that contained 0.05% metal chelate additive and at least 0.5% HMPA (TFC membranes 5-9) had a significant increase in flux as compared to the membranes that did not contain any metal chelate additive (TFC membranes 1-4). Table 11 shows a high level of salt rejection for all membranes tested at all time points and that addition of HMPA or a combination of HMPA and metal chelate additive did not negatively affect the salt rejection ability of the membranes.

TABLE 10

Flux measurements of TFC membranes 1-9

| TFC membrane | Flux (GFD) 1 hr | Flux (GFD) 8-11 hrs |
|---|---|---|
| 1 | 15.04 | 16.21 |
| (0% HMPA, 0% metal chelate) | (1.28) | (1.44) |
| 2 | 17.26 | — |
| (0.5% HMPA, 0% metal chelate) | (1.34) | |
| 3 | 17.99 | — |
| (1% HMPA, 0% metal chelate) | (0.69) | |
| 4 | 16.95 | 17.83 |
| (1.5% HMPA, 0% metal chelate) | (1.30) | (2.00) |
| 5 | 32.31 | 34.50 |
| (0.5% HMPA, 0.05% metal chelate) | (1.1) | (1.1) |
| 6 | 31.53 | 33.56 |
| (0.75% HMPA, 0.05% metal chelate) | (1.6) | (1.6) |
| 7 | 31.05 | 34.31 |
| (1% HMPA, 0.05% metal chelate) | (1.88) | (1.88) |
| 8 | 31.18 | 34.13 |
| (1.25% HMPA, 0.05% metal chelate) | (1.86) | (1.86) |
| 9 | 30.94 | — |
| (1.5% HMPA, 0.05% metal chelate) | (2.58) | |

TABLE 11

Salt rejection measurements of TFC membranes 1-9

| TFC membrane | Salt rejection (%) 1 hr | Salt rejection (%) 8-11 hrs |
|---|---|---|
| 1 | 99.59 | 99.52 |
| (0% HMPA, 0% metal chelate) | (0.29) | (0.27) |
| 2 | 99.73 | — |
| (0.5% HMPA, 0% metal chelate) | (0.07) | |
| 3 | 99.73 | — |
| (1% HMPA, 0% metal chelate) | (0.04) | |
| 4 | 99.73 | 99.64 |
| (1.5% HMPA, 0% metal chelate) | (0.02) | (0.04) |
| 5 | 99.70 | 99.75 |
| (0.5% HMPA, 0.05% metal chelate) | (0.03) | (0.03) |
| 6 | 99.67 | 99.74 |
| (0.75% HMPA, 0.05% metal chelate) | (0.06) | (0.06) |
| 7 | 99.74 | 99.69 |
| (1% HMPA, 0.05% metal chelate) | (0.05) | (0.05) |
| 8 | 99.72 | 99.67 |
| (1.25% HMPA, 0.05% metal chelate) | (0.04) | (0.04) |
| 9 | 99.64 | — |
| (1.5% HMPA, 0.05% metal chelate) | (0.02) | |

2. Preparation and Comparison of Thin Film Composite Membranes Containing a Metal Chelate Additive and Varying Amounts of a Phosphoramide Thin film composite membranes containing either 0.5% or 1% of a phosphoramide and 0.06% of a surfactant were prepared and tested for flux and salt rejection and compared to membranes not containing any phosphoramide or phosphoramide and surfactant. TFC membranes 12-15, shown in Tables 12-15, below, were prepared according to the procedure described in Example 1, above.

Components of the aqueous phase included: a polyamine, m-phenylenediamine (MPD; DuPont, Wilmington, Del.); a drying agent, triethylamine camphorsulfonic acid (TEACSA; Sunland Chemical and Research, Los Angeles, Calif.); a surfactant, sodium lauryl sulfate (SLS; Columbus Chemical Industries, Columbus, Wis.); a metal chelate additive, $Sr(F_6acac)_2$; a phosphoramide, hexamethyl-phosphoramide (HMPA; Sigma Aldrich, St. Louis, Mo.); and a polar solvent, water.

Components of the organic phase included: a polyfunctional acid halide, trimesoyl chloride (TMC; Sigma Aldrich, St. Louis, Mo.); non-polar liquids that include 1,3,5-trimethylbenzene (TMB, mesitylene; Sigma Aldrich, St. Louis, Mo.) and Isopar™ G solvent (a low odor, low aromatic hydrocarbon solvent from ExxonMobile Chemical Company, Houston, Tex.)

Tables 12-15 below list the components and amounts of each in TFC membranes 12-15.

TABLE 12

TFC membrane 12 containing 0.05% metal chelate additive and no HMPA or surfactant

| Ingredient | Phase | wt % of composition |
|---|---|---|
| MPD (polyamine) | Aqueous | 2.5 |
| TEACSA (drying agent) | Aqueous | 6.75 |
| $Sr(F_6acac)_2$ (metal chelate additive) | Aqueous | 0.05 |
| HMPA (phosphoramide) | Aqueous | — |
| Water (polar solvent) | Aqueous | 90.7 |
| TMC (polyfunctional acid halide) | Organic | 0.205 |
| 4% TMB in Isopar ™ G (non-polar solvents) | Organic | 99.80 |

TABLE 13

TFC membrane 13 containing 0.05% metal chelate additive, 0.06% surfactant, and no HMPA

| Ingredient | Phase | wt % of composition |
|---|---|---|
| MPD (polyamine) | Aqueous | 2.5 |
| TEACSA (drying agent) | Aqueous | 6.75 |
| SLS (surfactant) | Aqueous | 0.06 |
| $Sr(F_6acac)_2$ (metal chelate additive) | Aqueous | 0.05 |
| HMPA (phosphoramide) | Aqueous | — |
| Water (polar solvent) | Aqueous | 90.64 |
| TMC (polyfunctional acid halide) | Organic | 0.205 |
| 4% TMB in Isopar ™ G (non-polar solvents) | Organic | 99.80 |

TABLE 14

TFC membrane 13 containing 0.05% metal chelate additive, 0.06% surfactant, and 0.5% HMPA

| Ingredient | Phase | wt % of composition |
|---|---|---|
| MPD (polyamine) | Aqueous | 2.5 |
| TEACSA (drying agent) | Aqueous | 6.75 |
| SLS (surfactant) | Aqueous | 0.06 |
| $Sr(F_6acac)_2$ (metal chelate additive) | Aqueous | 0.05 |
| HMPA (phosphoramide) | Aqueous | 0.5 |
| Water (polar solvent) | Aqueous | 90.14 |
| TMC (polyfunctional acid halide) | Organic | 0.205 |
| 4% TMB in Isopar ™ G (non-polar solvents) | Organic | 99.80 |

TABLE 15

TFC membrane 15 containing 0.05% metal chelate additive, 0.06% surfactant, and 1% HMPA

| Ingredient | Phase | wt % of composition |
|---|---|---|
| MPD (polyamine) | Aqueous | 2.5 |
| TEACSA (drying agent) | Aqueous | 6.75 |
| SLS (surfactant) | Aqueous | 0.06 |
| $Sr(F_6acac)_2$ (metal chelate additive) | Aqueous | 0.05 |
| HMPA (phosphoramide) | Aqueous | 1.0 |
| Water (polar solvent) | Aqueous | 89.64 |
| TMC (polyfunctional acid halide) | Organic | 0.205 |
| 4% TMB in Isopar ™ G (non-polar solvents) | Organic | 99.80 |

The flux and salt rejection of the TFC membranes shown in Tables 12-15, above, were tested under standard brackish water conditions (225 psi, 2,000 ppm salinity) after 1 hour and again after sitting overnight (8-11 hours) as described in Example 1, above. Table 16, below, shows the results of the flux measurement tests and Table 17, below, shows the results of the salt rejection tests, with standard deviation values listed in parentheses. As shown in Table 16, flux increased for the membranes that contained both HMPA and metal chelate additive (TFC membranes 14 and 15) as compared to the membrane that did not contain either metal chelate additive or HMPA (TFC membrane 12) or the membrane that did not contain HMPA, but contained 0.05% metal chelate additive (TFC membrane 13). In the membranes containing metal chelate additive, the flux slightly increased as the amount of HMPA increased from 0% up to 1% HMPA (TFC membranes 13-15). Salt rejection measurement values are indicated in Table 17 and show a high level of salt rejection for all membranes tested at all time points and that increasing the amount of HMPA did not negatively affect the salt rejection ability of the membranes.

TABLE 16

Flux measurements of TFC membranes 12-15

| TFC membrane | Flux (GFD) 1 hr | Flux (GFD) 8-11 hrs |
|---|---|---|
| 12 (0% HMPA, 0% metal chelate, 0% SLS) | 30.70 (1.58) | — |
| 13 (0% HMPA, 0.05% metal chelate, 0.06% SLS) | 34.09 (1.94) | — |
| 14 (0.5% HMPA, 0.05% metal chelate, 0.06% SLS) | 40.39 (2.53) | 40.81 |
| 15 (1% HMPA, 0.05% metal chelate, 0.06% SLS) | 43.25 (2.72) | 44.38 |

TABLE 17

Salt rejection measurements of TFC membranes 12-15

| TFC membrane | Salt rejection (%) 1 hr | Salt rejection (%) 8-11 hrs |
|---|---|---|
| 12 (0% HMPA, 0% metal chelate, 0% SLS) | 99.71 (0.04) | — |
| 13 (0% HMPA, 0.05% metal chelate, 0.06% SLS) | 99.67 (0.07) | — |
| 14 (0.5% HMPA, 0.05% metal chelate, 0.06% SLS) | 99.50 (0.08) | 99.22 |
| 15 (1% HMPA, 0.05% metal chelate, 0.06% SLS) | 99.34 (0.09) | 99.32 |

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A process for preparing a thin film composite membrane, comprising:

(a) preparing an aqueous phase comprising a polyamine and an organic phase comprising a polyfunctional acid halide, wherein the aqueous phase or organic phase or both further include a flux enhancing combination that comprises:

(i) a metal chelate additive containing a bidentate ligand and a metal atom or metal ion; and (ii) a phosphoramide;

(b) applying the aqueous phase to a surface of a porous support membrane to form a coated support membrane; and (c) applying the organic phase to the coated support membrane and interfacially polymerizing the polyamine and the polyfunctional acid halide to form a discrimination layer of a thin film composite membrane comprising the porous support membrane and the discrimination layer, the thin film composite membrane having a water flux and that is greater than the water flux of a thin film composite membrane prepared in the absence of the flux enhancing combination.

2. The process of claim 1, wherein the bidentate ligand is selected from among:

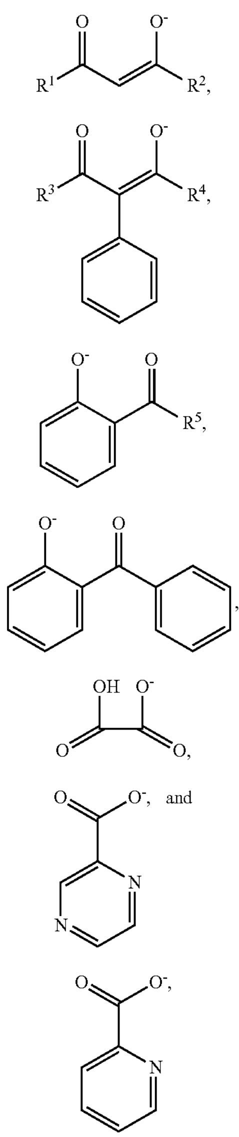

wherein each of $R^1$, $R^2$, $R^3$, $R^4$ and $R^5$ separately is selected from among a $C_1$-$C_{10}$ alkyl, a halogenated $C_1$-$C_{10}$ alkyl, a 5-membered aromatic ring, a 6-membered aromatic ring, an aromatic bicyclic ring system containing two fused 6-membered rings, and an aromatic bicyclic ring system containing a 5-membered ring fused to a 6-membered aromatic ring.

3. The process of claim 2, wherein the bidentate ligand is an acetylacetonate (acac) or fluorinated acetylacetonate.

4. The process of claim 1, wherein the metal chelate additive containing a bidentate ligand and a metal atom or metal ion is selected from among $Al(acac)_3$, $Al(F_6acac)_3$, $Ba(acac)_2$, $Ba(F_6acac)_2$, $Be(acac)_2$, $Be(F_6acac)_2$, $Ca(acac)_2$, $Ca(F_6acac)_2$, $Cd(acac)_2$, $Cd(F_6acac)_2$, $Ce(acac)_3$, $Ce(F_6acac)_3$, $Cr(acac)_3$, $Co(acac)_3$, $Cu(acac)_2$, $Cu(F_6acac)_2$, $Dy(acac)_3$, $Er(acac)_3$, $Fe(acac)_2$, $Fe(acac)_3$, $Ga(acac)_3$, $Hf(acac)_4$, $In(acac)_3$, K(acac), Li(acac), $Mg(acac)_2$, $Mg(F_6acac)_2$, $Mn(acac)_2$, $Mn(acac)_3$, $MoO_2(acac)_2$, $MoO_2(F_6acac)_2$, Na(acac), $Nd(acac)_3$, $Nd(F_6acac)_3$, $Ni(acac)_2$, $Ni(F_6acac)_2$, $Pd(acac)_2$, $Pr(acac)_3$, $Pr(F_6acac)_3$, $Ru(acac)_3$, $Ru(F_6acac)_3$, $Sc(acac)_2$, $Sc(F_6acac)_2$, $Sm(acac)_3$, $Sn(acac)_2$, $Sn(acac)_2Cl_2$, t-butyl-$Sn(acac)_2$, t-butyl-$Sn(acac)_2Cl_2$, $Sn(F_6acac)_2$, $Sr(acac)_2$, $Sr(F_6acac)_2$, $Tb(acac)_3$, $V(acac)_3$, $Y(acac)_3$, $Y(F_6acac)_3$, $Zn(acac)_2$, $Zn(F_6acac)_2$, and $Zr(acac)_4$, wherein $F_6acac$ refers to 1,1,1,5,5,5-hexafluoroacetylacetonate.

5. The process of claim 1, wherein the bidentate ligand is a beta-diketonate or a fluorinated beta-diketonate.

6. The process of claim 5, wherein the bidentate ligand is selected from among pentane-2,4-dionate, 1,5-difluoropentane-2,4-dionate, 1,1,5,5-tetrafluoropentane-2,4-dionate, 1,1,1,5,5,5-hexafluoropentane-2,4-dionate, propane-1,3-dionate, butane-1,3-dionate, 4-fluorobutane-1,3-dionate, 4,4-difluorobutane-1,3-dionate, 4,4,4-trifluorobutane-1,3-dionate, heptane-3,5-dionate, 1-fluorohexane-2,4-dionate, 1,5-difluoropentane-2,4-dionate, 1,1,5-trifluoropentane-2,4-dionate, 1,1,5,5-tetrafluoropentane-2,4-dionate, 1,1,1,5,5-pentafluoropentane-2,4-dionate, 1,1,1,5,5,5-hexafluoropentane-2,4-dionate and octane-3,5-dionate and combinations thereof.

7. The process of claim 1, wherein the amount of bidentate ligand in the metal chelate additive yields a concentration of bidentate ligand in the aqueous phase of step (a) of from about 0.001 wt % to about 1 wt %, based on the weight of the aqueous phase.

8. The process of claim 1, wherein the metal atom or metal ion is selected from Group 2 or Group 13 of the periodic table.

9. The process of claim 1, wherein the metal atom or metal ion is an alkaline earth metal.

10. The process of claim 1, wherein the amount of metal atom or metal ion in the metal chelate additive yields a concentration of metal atom or metal ion in the aqueous phase or the organic phase of step (a) of from about 0.00001 wt % to about 1 wt %, based on the weight of the aqueous phase or the organic phase.

11. The process of claim 1, wherein the amount of metal chelate additive added to the aqueous phase or organic phase yields a concentration of metal chelate additive in the aqueous phase or the organic phase of step (a) of from about 0.001 wt % to about 1 wt %, based on the weight of the aqueous phase or the organic phase.

12. The process of claim 1, wherein the phosphoramide is of the formula:

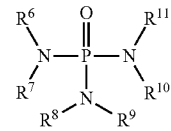

wherein each of $R^6$, $R^7$, $R^8$, $R^9$, $R^{10}$ and $R^{11}$ separately is selected from among hydrogen, a $C_1$-$C_{10}$ alkyl, a halogenated $C_1$-$C_{10}$ alkyl, a 5-membered aromatic ring, a 6-membered aromatic ring, an aromatic bicyclic ring system containing two fused 6-membered rings, and an aromatic bicyclic ring system containing a 5-membered ring fused to a 6-membered aromatic ring.

13. The process of claim 1, wherein the amount of phosphoramide present in the combination yields a concentration of phosphoramide in the aqueous phase or organic phase of step (a) of from about 0.1% to 4% based on the weight of the aqueous phase or organic phase.

14. The process of claim 1, wherein the phosphoramide is hexamethylphosphoramide (HMPA).

15. The process of claim 1, further comprising adding a processing aid selected from among a surfactant, a co-solvent, a drying agent, a catalyst, or any combination thereof to the aqueous phase prior to applying the aqueous phase to the porous support membrane.

16. The process of claim 15, wherein the amount of processing aid in the aqueous phase prior to applying the aqueous phase to the porous support membrane is from about 0.001 wt % to about 10 wt % based on the weight of the aqueous phase.

17. The process of claim 1, wherein the aqueous phase or the organic phase or both further comprises nanoparticles selected from among zeolites, fullerenes and carbon nanotubes and combinations thereof.

18. The process of claim 17, wherein:

a) the nanoparticles are present in the aqueous phase of step (a) in an amount from about 0.001 wt % to about 0.5 wt % based on the weight of the aqueous phase; or b) the nanoparticles are present in the organic phase of step (b) in an amount from about 0.001 wt % to about 0.5 wt % based on the weight of the organic phase; or c) both a) and b).

19. The process of claim 1, wherein the thin film composite membrane is a reverse osmosis membrane.

* * * * *